US010089397B2

(12) United States Patent
Mitsuhashi et al.

(10) Patent No.: US 10,089,397 B2
(45) Date of Patent: Oct. 2, 2018

(54) DIAGNOSTIC DEVICE, DIAGNOSTIC SYSTEM, DIAGNOSTIC METHOD, AND NON-TRANSITORY COMPUTER-READABLE MEDIUM

(71) Applicant: FUJI XEROX CO., LTD., Tokyo (JP)

(72) Inventors: Tomoyuki Mitsuhashi, Kanagawa (JP); Tsutomu Udaka, Kanagawa (JP); Katsuyuki Kouno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 82 days.

(21) Appl. No.: 15/163,985

(22) Filed: May 25, 2016

(65) Prior Publication Data
US 2017/0185501 A1 Jun. 29, 2017

(30) Foreign Application Priority Data

Dec. 25, 2015 (JP) .................................. 2015-254318

(51) Int. Cl.
G06F 11/00 (2006.01)
G06F 17/30 (2006.01)
G06F 11/32 (2006.01)

(52) U.S. Cl.
CPC ...... *G06F 17/30867* (2013.01); *G06F 11/322* (2013.01)

(58) Field of Classification Search
CPC ............ G06F 11/0709; G06F 11/1625; G06F 11/3013; G06F 11/327; G06F 17/30867
See application file for complete search history.

(56) References Cited

U.S. PATENT DOCUMENTS

| 8,849,587 | B1 * | 9/2014 | Lightle | G01R 31/027 340/646 |
| 9,223,299 | B2 * | 12/2015 | Jenkins | G05B 9/02 |
| 2007/0070456 | A1 | 3/2007 | Nishimura | |
| 2008/0126860 | A1 * | 5/2008 | Sampath | G06F 11/0733 714/25 |
| 2008/0239361 | A1 * | 10/2008 | Nagami | G06F 3/1212 358/1.14 |
| 2009/0002490 | A1 * | 1/2009 | Saito | G08B 13/1672 348/143 |
| 2011/0055669 | A1 * | 3/2011 | DeHaan | G06F 11/0709 714/799 |

(Continued)

FOREIGN PATENT DOCUMENTS

| CN | 105004497 A | 10/2015 |
| JP | H10-149365 A | 6/1998 |

(Continued)

OTHER PUBLICATIONS

Yoshihisa Ihara et al., "Development of Portable Damage-Detection Device for Conveyer Rollers" Ishikawajima-Harima Engineering Review, vol. 41, No. 1, 2001.

(Continued)

*Primary Examiner* — Joshua P Lottich
(74) *Attorney, Agent, or Firm* — Oliff PLC

(57) ABSTRACT

A diagnostic device includes an input unit that accepts input of an onomatopoeia to use in a sound sample search, a search unit that searches for a sound sample matching the input onomatopoeia, and a display that displays a search result from the search unit.

12 Claims, 25 Drawing Sheets

(56) References Cited

U.S. PATENT DOCUMENTS

| | | | |
|---|---|---|---|
| 2014/0233743 A1* | 8/2014 | Hillbratt | G06F 11/00 381/60 |
| 2016/0143611 A1* | 5/2016 | Ota | A61B 6/586 378/207 |
| 2017/0026610 A1* | 1/2017 | Kwon | H04N 5/9202 |

FOREIGN PATENT DOCUMENTS

| | | |
|---|---|---|
| JP | 2007-079263 A | 3/2007 |
| JP | 2008-290288 A | 12/2008 |
| JP | 2009-025015 A | 2/2009 |

OTHER PUBLICATIONS

Yutaro Kurokawa et al., "Analysis of Music Expression by Onomatopoeia and Development of Automatic Conversion System", IEICE Technical Report, 2014.

Aug. 4, 2016 Office Action issued in Japanese Patent Application No. 2015-254318.

Jul. 18, 2018 Office Action issued in Chinese Patent Application No. 201610511672.8.

\* cited by examiner

FIG. 5

MODEL NAME: ABC003
MODEL NAME: ABC002
MODEL NAME: ABC001

| WAVEFORM DATA OF FREQUENCY ANALYSIS RESULT | SOUND DATA OF NOISE | CAUSE OF NOISE | TREATMENT | ONOMATOPOEIA | NOISE TYPE |
|---|---|---|---|---|---|
| SAMPLE WAVEFORM 1 | SOUND DATA 1 | WEAR ON PHOTORECEPTOR DRUM | REPLACE PHOTORECEPTOR DRUM | GI-GI-GI-GI | CONTINUOUS |
| SAMPLE WAVEFORM 2 | SOUND DATA 2 | INSUFFICIENT GREASE IN SHEET TRANSPORT DEVICE | APPLY GREASE | CLACK-CLACK-CLACK | STACCATO |
| ..... | ..... | ..... | ..... | ..... | ..... |
| SAMPLE WAVEFORM 30 | SOUND DATA 30 | TROUBLE WITH DRIVING MOTOR | REPLACE DRIVING MOTOR | KRRRR | IRREGULAR |

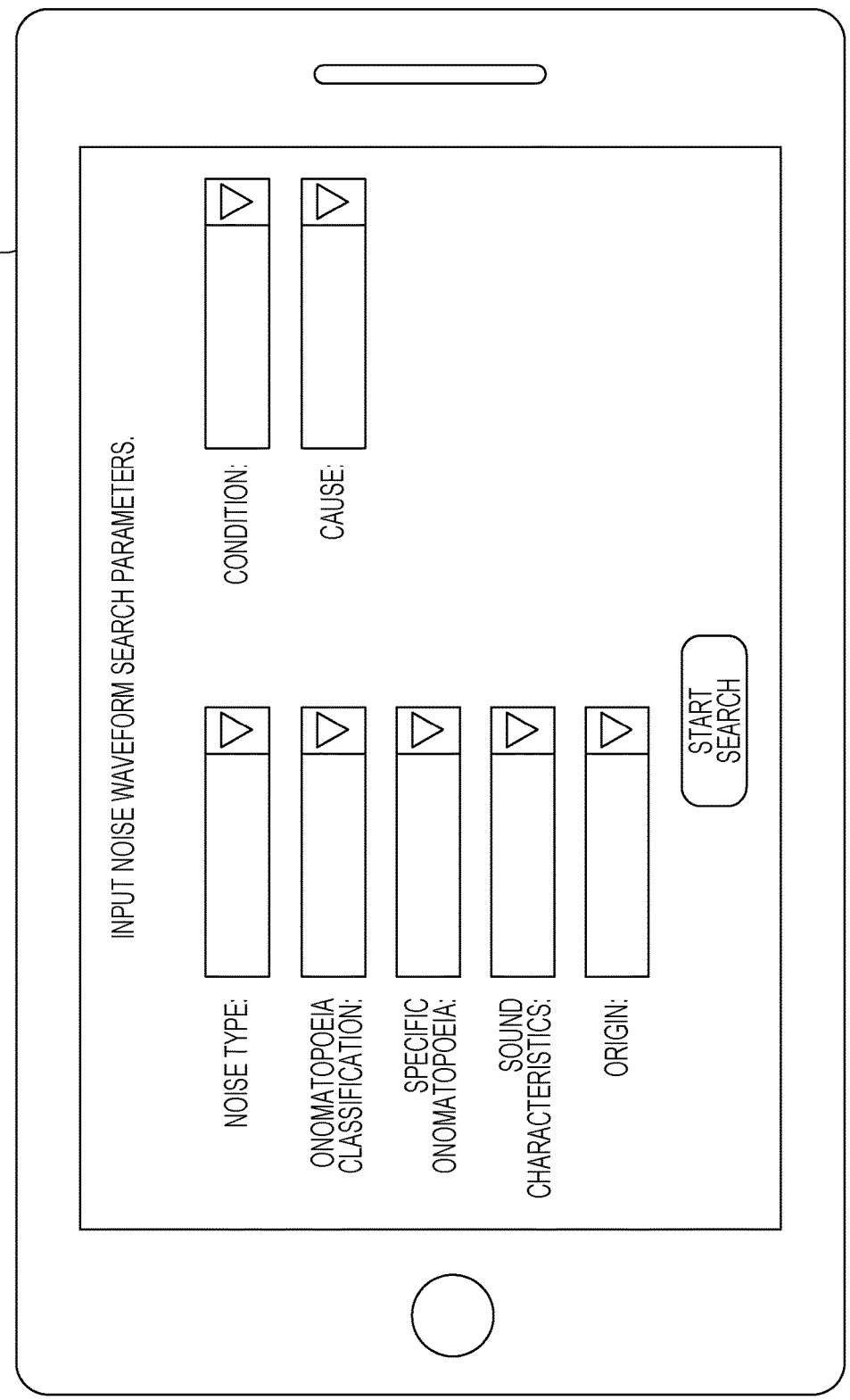

FIG. 17

| SEARCH TERM | SEARCH PARAMETER NAME | | | | |
|---|---|---|---|---|---|
| NOISE TYPE | STACCATO | CONTINUOUS | ONE-TIME | IRREGULAR | ... |
| ONOMATOPOEIA CLASSIFICATION | SQUEALING | SQUEAKING | GRINDING | RATTLING | ... |
| SPECIFIC ONOMATOPOEIA | (SET FOR EACH ONOMATOPOEIA CLASSIFICATION) | | | | |
| SOUND CHARACTERISTICS | HIGH-PITCHED | LOW-PITCHED | LOUD | QUIET | ... |
| ORIGIN | PHOTORECEPTOR DRUM | FUSER | INTERMEDIATE TRANSFER BELT | PAPER FEED TRAY | ... |
| CONDITION | USING HEAVY PAPER | DURING DUPLEX PRINTING | DURING COLOR PRINTING | DURING MONOCHROME PRINTING | ... |
| CAUSE | COMPONENT INTERFERENCE | BEARING DAMAGE | MISSING GEAR TOOTH | INSUFFICIENT GREASE | ... |

FIG. 18

| ONOMATOPOEIA CLASSIFICATION | SPECIFIC ONOMATOPOEIA | | | |
| --- | --- | --- | --- | --- |
| SQUEALING | KRRRR | KEEEE | GRRRR | |
| SQUEAKING | KI-KI-KI | GI-GI-GI | CREAK CREAK | |
| GRINDING | CRUNCH CRUNCH | GA-GA-GA | GO-GO-GO | CLUNK CLUNK |
| RATTLING | CLICK-CLICK-CLICK | CLACK-CLACK-CLACK | CLICK-CLACK CLICK-CLACK | CLANG CLANG |
| THUDDING | THUD | BANG | THUMP | |

FIG. 23

| NO. | SAMPLE WAVEFORM NO. | ONOMATOPOEIA | ORIGIN | PLAY SOUND | SHOW WAVEFORM |
|---|---|---|---|---|---|
| 1 | SAMPLE WAVEFORM 3 | KRRRR | PHOTORECEPTOR DRUM | 🔊 | ∿ |
| 2 | SAMPLE WAVEFORM 5 | KEEEE | PAPER FEED TRAY | 🔊 | ∿ |
| 3 | SAMPLE WAVEFORM 11 | KRRRR | PHOTORECEPTOR DRUM | 🔊 | ∿ |
| 4 | SAMPLE WAVEFORM 23 | KRRRR | INTERMEDIATE TRANSFER BELT | 🔊 | ∿ |
| 5 | SAMPLE WAVEFORM 49 | KEEEE | INTERMEDIATE TRANSFER BELT | 🔊 | ∿ |

SEARCH RESULTS
SEARCH PARAMETERS: STACCATO, SQUEALING, HIGH-PITCHED

DIAGNOSTIC DEVICE, DIAGNOSTIC SYSTEM, DIAGNOSTIC METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2015-254318 filed Dec. 25, 2015.

BACKGROUND

Technical Field

The present invention relates to a diagnostic device, a diagnostic system, a diagnostic method, and a non-transitory computer-readable medium.

SUMMARY

According to an aspect of the invention, there is provided a diagnostic device including an input unit that accepts input of an onomatopoeia to use in a sound sample search, a search unit that searches for a sound sample matching the input onomatopoeia, and a display that displays a search result from the search unit.

BRIEF DESCRIPTION OF THE DRAWINGS

Exemplary embodiments of the present invention will be described in detail based on the following figures, wherein:

FIG. 5 is a diagram illustrating an example of information stored in the waveform data storage 53 illustrated in FIG. 4;

FIG. 15 is a diagram illustrating an example launch screen when a noise diagnostic device 10 is powered on;

FIG. 16 is a diagram illustrating an example screen for inputting noise sample waveform search parameters;

FIG. 17 is a diagram illustrating examples of noise sample waveform search parameters;

FIG. 18 is a diagram illustrating an example of correspondences between onomatopoeia classifications and specific onomatopoeia;

FIG. 23 is a diagram illustrating an example search results screen in a case in which a "start search" button is operated and a search is executed after search parameters like those illustrated in FIG. 21 are input;

DETAILED DESCRIPTION

Next, an exemplary embodiment of the present invention will be described in detail and with reference to the drawings.

Figure 1:
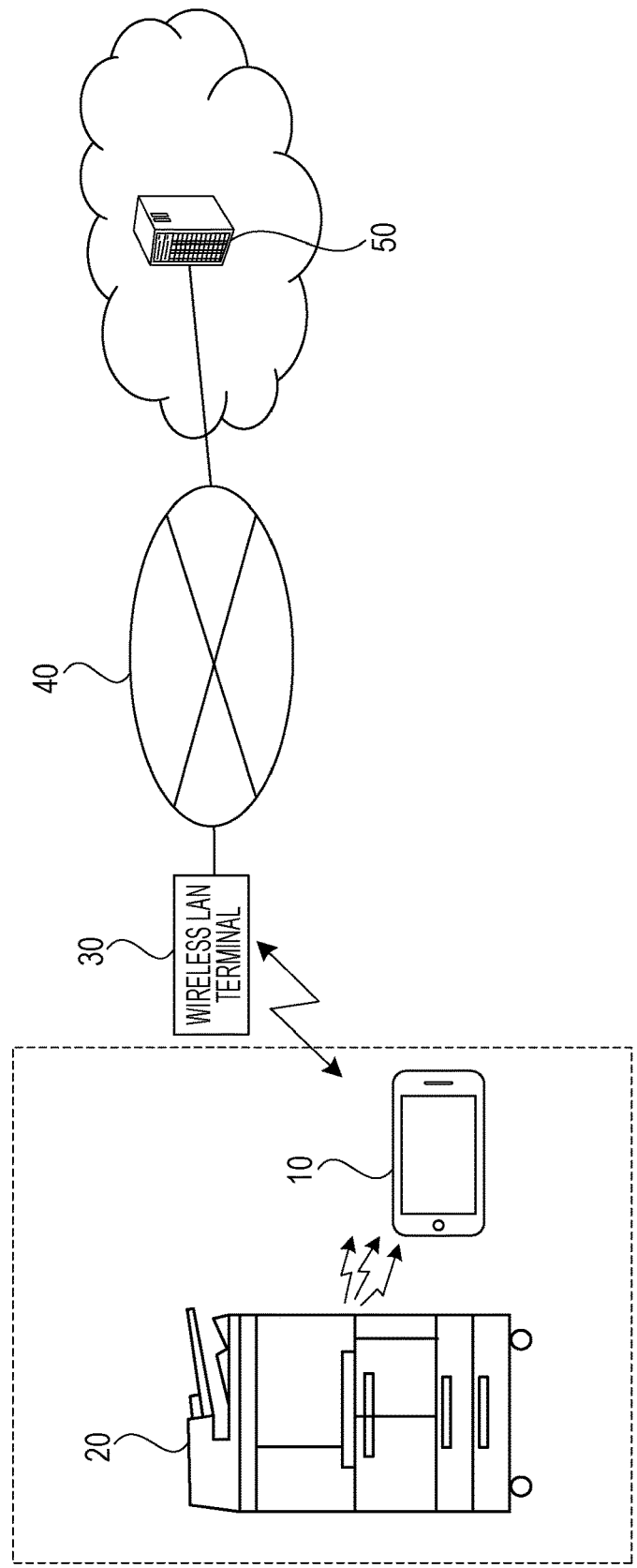
FIG. 1 is a system diagram illustrating a configuration of a noise diagnostic system according to an exemplary embodiment of the present invention.

FIG. 1 is a system diagram illustrating a configuration of a noise diagnostic system according to an exemplary embodiment of the present invention.

As illustrated in FIG. 1, the noise diagnostic system according to an exemplary embodiment of the present invention is made up of a mobile noise diagnostic device 10, such as a personal computer, a smartphone, or a tablet, and a server device 50.

Note that the present invention is still applicable insofar as the noise diagnostic device 10 is a device able to connect to the server device 50 over a communication network. However, the present exemplary embodiment will be described using a case in which the noise diagnostic device 10 is a tablet equipped with a device such as a microphone able to acquire a sound signal, and also allowing touch input.

The noise diagnostic device 10 is carried by a service engineer (maintenance personnel) who maintains, manages, and repairs an image forming device 20, such as a printer used by end users. The noise diagnostic device 10 is used to acquire a noise (abnormal sound) signal produced in the image forming device 20, perform frequency analysis of the acquired noise signal, and display a frequency analysis result waveform of previous noise signals acquired from the server device 50 and a frequency analysis result waveform of the acquired noise signal.

The noise diagnostic device 10 and the server device 50 are connected to each other and exchange information via a wireless LAN terminal 30, such as a Wi-Fi router, and an Internet communication network 40.

Note that when the noise diagnostic device 10 is a device such as a mobile phone or a smartphone, the noise diagnostic device 10 and the server device 50 may also connect to each other and exchange frequency analysis result waveform data via a mobile phone network.

In the noise diagnostic system according to the present exemplary embodiment, when a noise is produced in a certain image forming device 20 that acts as a target electronic device installed in an end user location, a service engineer carrying the noise diagnostic device 10 is dispatched to the location of the image forming device 20. Subsequently, the service engineer acquires a noise signal by using the noise diagnostic device 10 to record the noise being produced, and performs a noise diagnosis that identifies the cause of the noise.

Note that it is also technically possible to equip the image forming device 20 with a sound-recording function by providing a microphone or the like and cause the image forming device 20 to record noise using this sound-recording function when noise is produced, but when the image forming device 20 is installed in a location such as an end user office, providing the image forming device 20 with a function of recording sound may be undesirable for security reasons.

Figure 2:
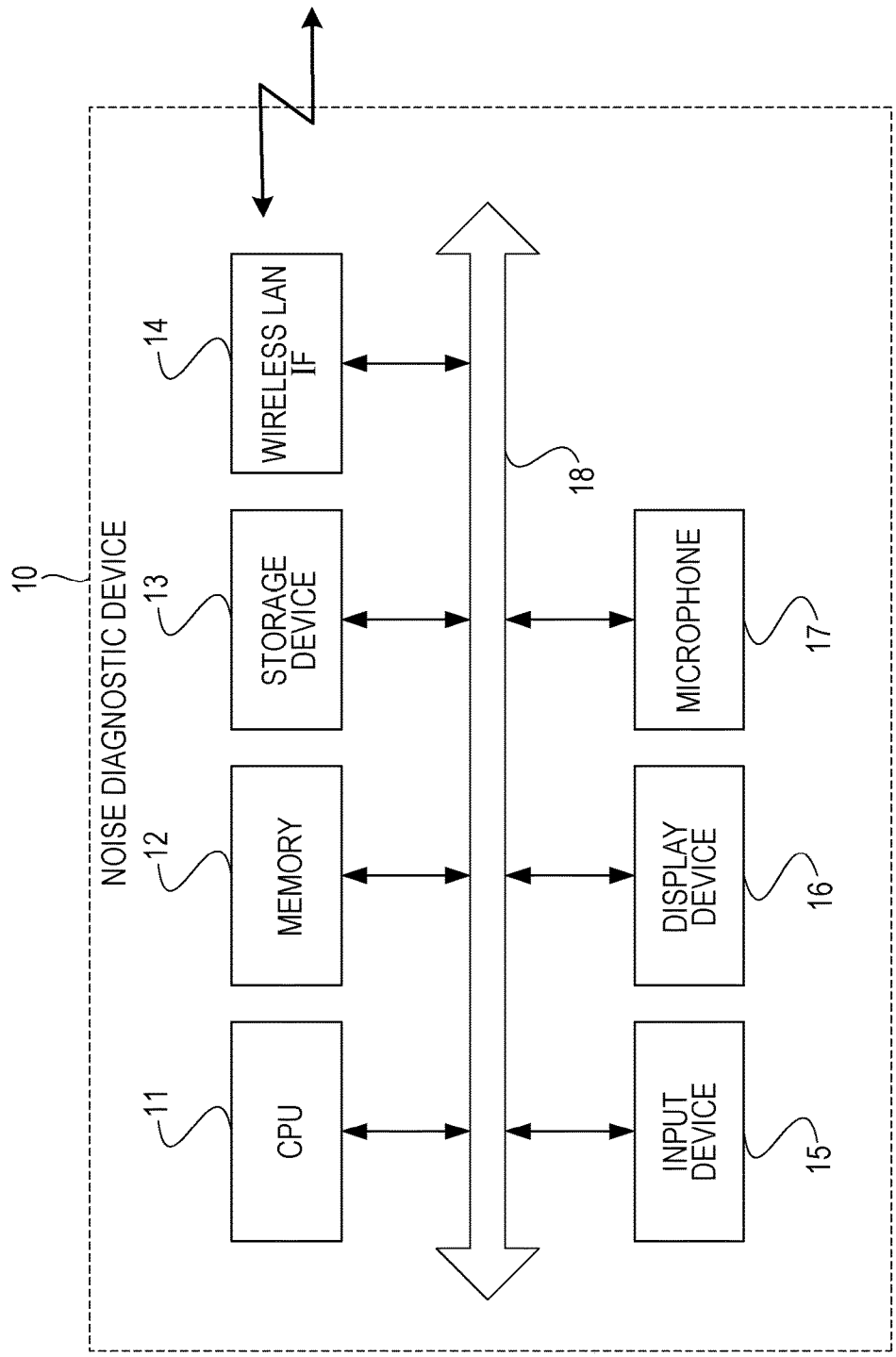
FIG. 2 is a block diagram illustrating a hardware configuration of a noise diagnostic device 10 according to an exemplary embodiment of the present invention.

Next, FIG. 2 illustrates a hardware configuration of the noise diagnostic device 10 in a noise diagnostic system according to the present exemplary embodiment.

As illustrated in FIG. 2, the noise diagnostic device 10 includes a CPU 11, memory 12 capable of saving data temporarily, a storage device 13 such as flash memory, a wireless LAN interface (IF) 14 that performs wireless communication to transmit and receive data to and from the wireless LAN terminal 30, an input device 15 such as a touch sensor, a display device 16, and a microphone 17. These structural elements are connected to each other by a control bus 18.

The noise diagnostic device 10 according to the present exemplary embodiment is equipped with a touch panel in which a touch sensor for detecting a touch position on the display device 16 is provided as the input device 15, and this touch panel is used to present a display while also accepting input from a user.

The CPU 11 controls the operation of the noise diagnostic device 10 by executing designated processes on the basis of a control program stored in the memory 12 or the storage device 13. Note that the control program may also be acquired and provided to the CPU 11 by being downloaded via the Internet communication network 40 or a mobile phone network, or be provided to the CPU 11 by storing such a program on a storage medium such as CD-ROM.

As a result of the above control program being executed, the noise diagnostic device 10 according to the present exemplary embodiment performs operations like those described hereinafter, and assists the service engineer in the work of identifying the cause of noise.

Figure 3:
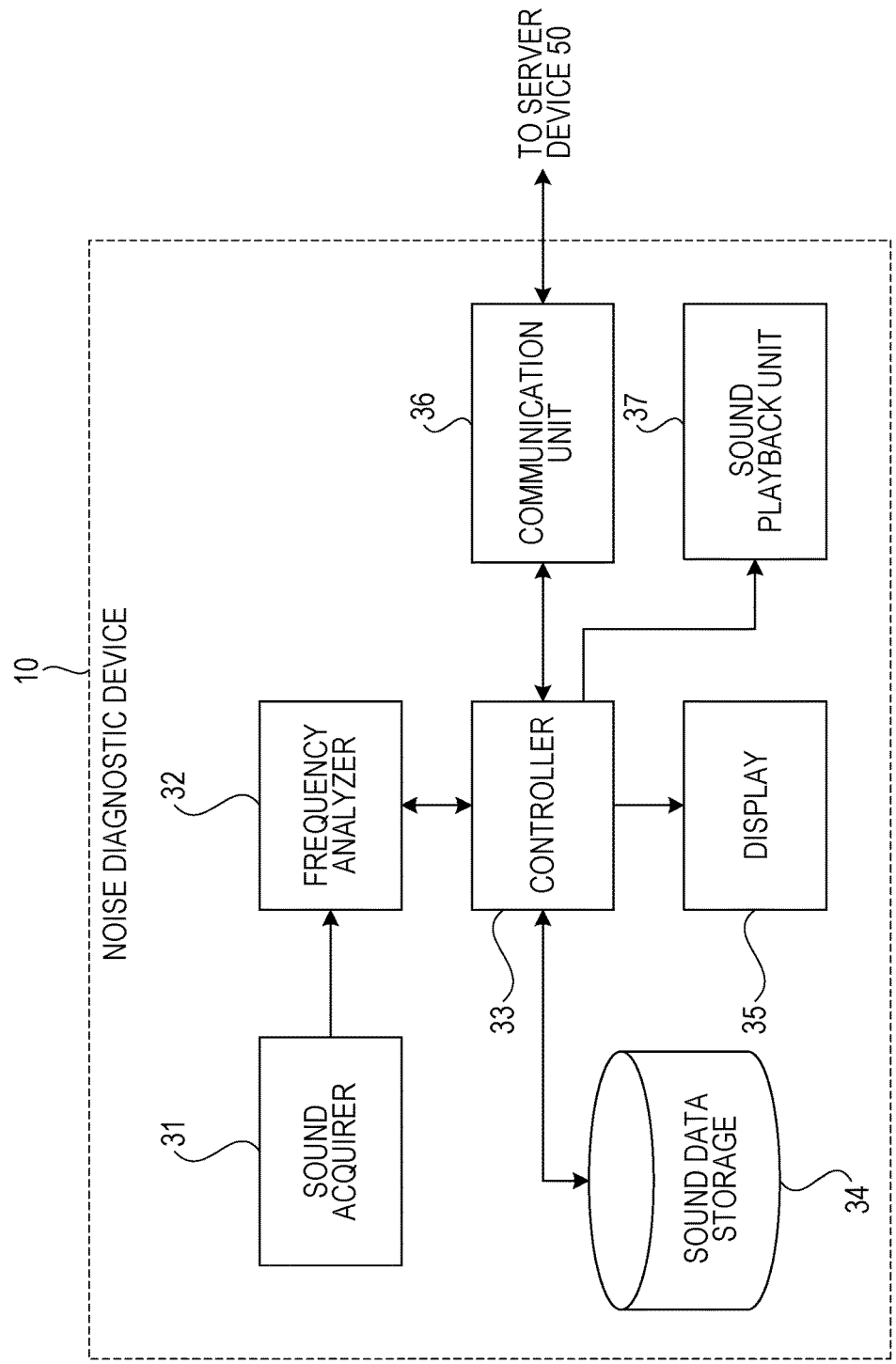
FIG. 3 is a block diagram illustrating a functional configuration of a noise diagnostic device 10 according to an exemplary embodiment of the present invention.

FIG. 3 is a block diagram illustrating a functional configuration of the noise diagnostic device 10 realized as a result of the above control program being executed.

As illustrated in FIG. 3, the noise diagnostic device 10 according to the present exemplary embodiment is equipped with a sound acquirer 31, a frequency analyzer 32, a controller 33, sound data storage 34, a display 35, a communication unit 36, and a sound playback unit 37.

The display unit 35 presents a display of various data on the basis of control by the controller 33. The communication unit 36 communicates with an external device, namely the server device 50. The sound playback unit 37, under control by the controller 33, plays back data recorded sound data and the like, converting the data into a sound signal.

The sound acquirer 31 acquires a sound signal by accepting the input of noise produced by a device to be analyzed, namely the image forming device 20.

Note that although the present exemplary embodiment describes the sound acquirer 31 as acquiring a sound signal by accepting the input of noise produced in the image forming device 20, the sound signal is an example of sound information.

The frequency analyzer 32 performs time-frequency analysis (time-dependent frequency analysis) on the sound signal acquired by the sound acquirer 31, and generates frequency spectrum waveform (frequency analysis result) data expressing the change over time in the signal intensity distribution at each frequency of the acquired noise signal.

Specifically, the frequency analyzer 32 generates frequency spectrum waveform data by applying the short-time Fourier transform (STFT) to the sound signal acquired by the sound acquirer 31. The STFT will be described later.

The controller 33 stores the frequency spectrum waveform data obtained by the frequency analyzer 32 together with the sound data in the sound data storage 34. Subsequently, the controller 33 displays the frequency spectrum waveform data obtained by the STFT result on the display unit 35 that acts as a touch panel.

After that, if the user performs a touch operation on the frequency spectrum waveform data displayed on the display 35, such as an operation of using a finger to trace a region estimated to be noise signal components, the controller 33 receives a specification of a region including noise signal components in the displayed frequency spectrum waveform data, on the basis of the user's touch operation.

Subsequently, the controller 33 instructs the frequency analyzer 32 to execute a fast Fourier transform that performs frequency analysis in the time axis direction (1D-FFT) on the frequency components in the region specified as the region including noise signal components from the frequency spectrum waveform data obtained by the frequency analyzer 32. Consequently, the frequency analyzer 32 performs the fast Fourier transform in the time axis direction on the frequency components included in the designated region.

Subsequently, the controller 33 extracts information about the period and the frequency of noise from the analysis result of the fast Fourier transform by the frequency analyzer 32.

Note that the signal components of ordinary operating sounds are also included in the region of low frequency less than or equal to a preset frequency, even when noise is not produced. For this reason, the controller 33 may also be configured to not accept a specification in the region less than or equal to the preset frequency, even when such a region is specified as the region including noise signal components.

In addition, the controller 33 transmits the information about the period and the frequency of the acquired noise, together with model information such as the model name and the serial number of the image forming device 20 and operating status information indicating the operating status of the image forming device 20, to the server device 50 via the communication unit 36. Specifically, the operating status information may be configured to include information indicating color printing or monochrome printing, information indicating double-sided printing or single-sided printing, information indicating whether the operating mode is scan, print, or copy, and information such as the type of paper used. In this way, the controller 33 transmits information obtained from the frequency spectrum waveform data obtained by the frequency analyzer 32 to the server device 50 via the communication unit 36.

In the server device 50, spectrum waveform data obtained by performing frequency analysis on sound signals of noise produced in the past by devices similar to the image forming device 20 is stored together with the original sound data and information such as the operating status of the device, cause of noise, and method of addressing the noise when that sound data was acquired.

Subsequently, from the information about the period and the frequency of the noise transmitted from the noise diagnostic device 10, the server device 50 searches for frequency spectrum waveform (second frequency analysis result waveform) data corresponding to the frequency spectrum waveform data obtained as a result of frequency analysis by the frequency analyzer 32, and transmits found frequency spectrum waveform data, together with information such as sound data stored as noise sample waveform data, to the noise diagnostic device 10.

As a result, the controller 33 receives, from the server device 50 via the communication unit 36, frequency spectrum waveform data corresponding to the frequency spectrum waveform data obtained as a result of the frequency analysis by the frequency analyzer 32.

The controller 33 displays, on the display 35, the frequency spectrum waveform data obtained by performing frequency analysis on the sound signal acquired by the sound acquirer 31, in parallel with the spectrum waveform received from the server device 50.

Note that if there are multiple sets of frequency spectrum waveform data transmitted from the server device 50, the controller 33 gives priority to the one among the multiple sets of frequency spectrum waveform data having the highest similarity to the frequency spectrum waveform data obtained by frequency analysis by the frequency analyzer 32 for display on the display 35.

Note that the noise diagnostic device 10 according to the present exemplary embodiment is not only equipped with a function of identifying the cause of noise by recording noise and performing frequency analysis on the noise, but is also equipped with a function of searching for frequency spectrum waveforms of noise, that is, sample waveforms of noise, stored in the server device 50, and referencing sample waveforms of noise matching the search parameters.

The noise diagnostic device 10 according to the present exemplary embodiment is configured to extract the period and the frequency of noise, and on the basis of the extracted period and frequency, search for a frequency spectrum waveform resembling the frequency spectrum waveform of the noise whose cause is to be identified. For this reason, if the noise to be analyzed is a one-time sound, for example, there is no period, and frequency is also difficult to extract from a one-time sound. Thus, it may be difficult to select and display a frequency spectrum waveform resembling the frequency spectrum waveform of the noise whose cause is to be identified.

For this reason, the noise diagnostic device 10 according to the present exemplary embodiment is equipped with a function enabling a large number of stored frequency spectrum waveforms of noise to be searched to reference certain frequency spectrum waveforms of noise that match specific conditions.

In addition, this function may also be used when referencing sample waveforms of noise that match specific conditions, because of reasons such as the service engineer wanting to know what types of noises have been produced in the past.

Additionally, when searching for such sound samples of noise, the noise diagnostic device 10 makes it possible to search for sound samples of noise using onomatopoeia.

In such cases, the controller 33 accepts the onomatopoeia of sample waveforms of noise to search for. The controller 33 then searches for sample waveforms of noise matching the accepted onomatopoeia, and displays the search results on the display 35.

Note that with the noise diagnostic device 10 according to the present exemplary embodiment, since the sample waveforms of noise are stored in the server device 50, the controller 33 transmits information about the accepted onomatopoeia to the server device 50, and receives, from the server device 50, search results of sample waveforms of noise matching the accepted onomatopoeia. The controller 33 then displays the search results of sample waveforms of noise received from the server device 50 on the display 35.

Also, since a wide range of variations in onomatopoeia exist, the noise diagnostic device 10 according to the present exemplary embodiment classifies a wide range of onomatopoeia, and makes it possible to search for sound samples by onomatopoeia classification.

In such cases, the controller 33 accepts an onomatopoeia classification of sample waveforms of noise to search for. The controller 33 then searches for sample waveforms of noise matching the accepted onomatopoeia classification, and displays the search results on the display 35.

Note that if one onomatopoeia is selected from among multiple onomatopoeia candidates, the controller 33 may also use the sound playback unit 37 to play back a sound corresponding to the selected onomatopoeia.

Similarly, if one onomatopoeia classification is selected from among multiple onomatopoeia classification candidates, the controller 33 may also use the sound playback unit 37 to play back a sound corresponding to the selected onomatopoeia classification.

Also, if an onomatopoeia classification candidate is selected, the controller 33 may also display multiple onomatopoeias included in the selected classification candidate.

Note that the present exemplary embodiment describes the case of using a frequency analysis result waveform expressing change over time in the intensity distribution at each frequency of noise as the sample waveform of noise (sound sample), but it is also possible to use waveform data other than a frequency analysis result waveform of noise as the sample waveform of noise.

Next, a functional configuration of the server device 50 in a noise diagnostic system according to the present exemplary embodiment will be described with reference to the block diagram in FIG. 4.

Figure 4:
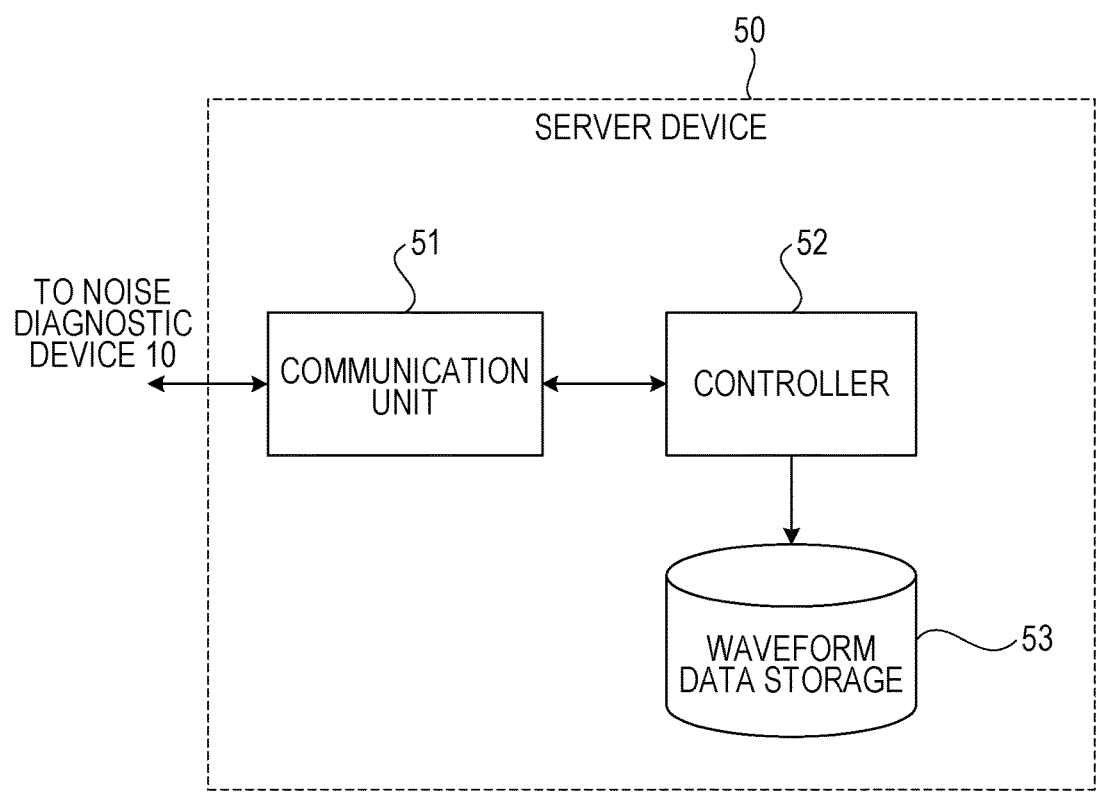
FIG. 4 is a block diagram illustrating a functional configuration of a server device 50 according to an exemplary embodiment of the present invention.

As illustrated in FIG. 4, the server device 50 according to the present exemplary embodiment is equipped with a communication unit 51, a controller 52, and waveform data storage 53.

The waveform data storage 53 stores, as sample waveforms of noise (sound samples), multiple sets of frequency spectrum waveform data obtained by performing frequency analysis on sound signals of noise produced in the past by devices similar to the device to be analyzed, namely the image forming device 20. Respective onomatopoeia are also stored in association with the frequency spectrum waveform data stored in the waveform data storage 53.

Specifically, as illustrated in FIG. 5, the waveform data storage 53 stores, for each model, information such as frequency spectrum waveform data (a sample waveform) obtained by performing a time-frequency analysis on the sound data of previously acquired noise, the original sound data, the cause of the noise, the treatment to address the noise, onomatopoeia expressing the noise in words, and the noise type.

Herein, onomatopoeia is an expression of noise in words, such as krrrr, crunch crunch, and clack-clack-clack, for example. Also, noise type is a classification into types of sound, such as a staccato sound, a continuous sound, a one-time sound, and an irregular sound.

Note that, although not illustrated in FIG. 5, information other than the above information, such as sound characteristics like a high-pitched sound, a low-pitched sound, a loud sound, or a quiet sound, conditions for producing the sound such as when using heavy paper, during duplex printing, during color printing, or during monochrome printing, and the cause of the sound such as component interference, bearing damage, missing gear tooth, or insufficient grease, are also stored together with the frequency spectrum waveform data.

Subsequently, in the case of receiving information about the period and the frequency of noise from the noise diagnostic device 10, the controller 52 selects waveform data similar to frequency spectrum waveform data based on the noise acquired in the noise diagnostic device 10 from among the multiple sets of frequency spectrum waveform data stored in the waveform data storage 53, on the basis of the received information about the period and the frequency of the noise, and transmits the selected waveform data to the noise diagnostic device 10 via the communication unit 51.

In addition, in the case of receiving information about onomatopoeia of sample waveforms of noise to search for from the noise diagnostic device 10, the controller 52 selects waveform samples matching the received information about onomatopoeia from among the multiple waveform samples stored in the waveform data storage 53, and transmits the selected waveform samples to the noise diagnostic device 10.

Note that since the onomatopoeia may be different depending on the perceptions of the individual service engineer or the expressive tendencies of the client attempting to express the sound, the onomatopoeia associated with waveform samples of noise stored in the waveform data storage 53 may not match up with the perceptions or the expressive tendencies of the user of the noise diagnostic device 10 in some cases.

For this reason, the controller 52 may be configured to be able to change the onomatopoeia associated with the multiple sample waveforms stored in the waveform data storage 53 for each user such as a service engineer, and thereby customize the onomatopoeia for each user. In this case, the common data stored in the waveform data storage 53 is not changed, but instead a storage area for specific service engineers may be provided, for example, and the data customized for each user such as the service engineer may be stored in this storage area.

Such customization of onomatopoeia may be executed according to instructions from a user such as a service engineer, or learned on the basis of onomatopoeia information set by the user with respect to sounds so that the onomatopoeia associated with the multiple sample waveforms stored in the waveform data storage 53 is updated automatically.

Figure 6:
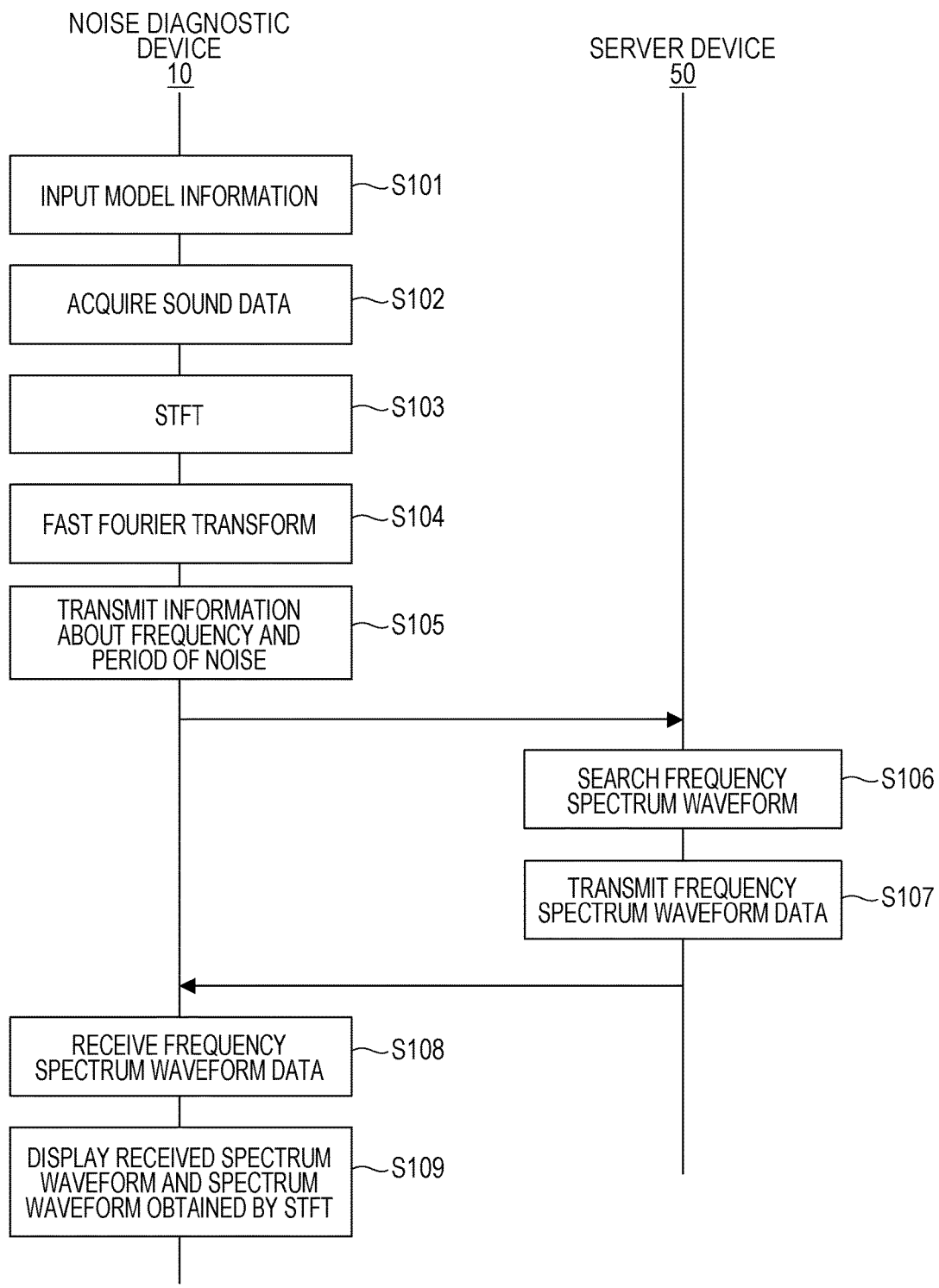
FIG. 6 is a sequence chart for explaining operation of a noise diagnostic system according to an exemplary embodiment of the present invention.

Next, the operation of the noise diagnostic system according to the present exemplary embodiment will be described with reference to the sequence chart in FIG. 6.

Figure 7:
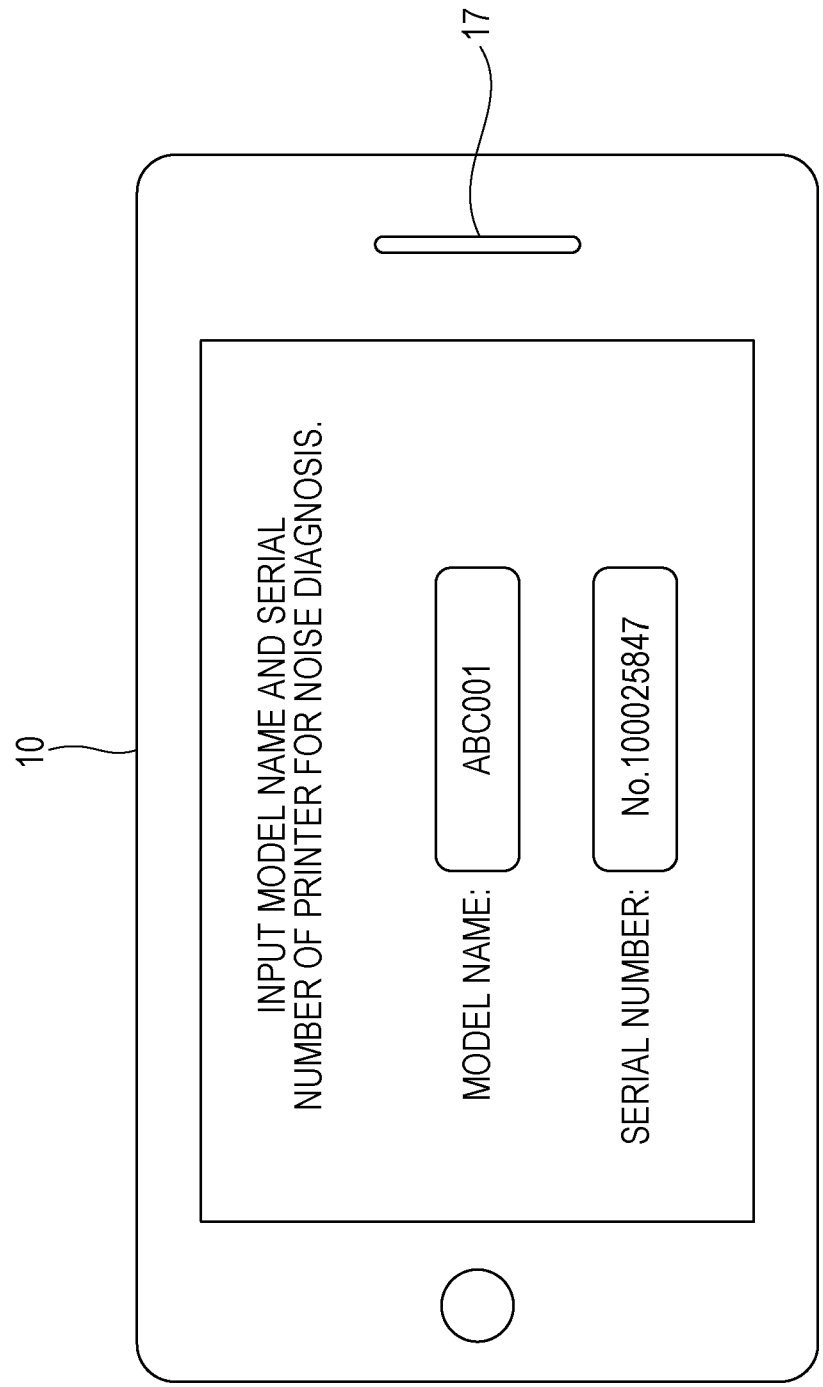
FIG. 7 is a diagram illustrating an example display screen on the noise diagnostic device 10 when inputting various information such as a model name, a serial number, and an operating status.

In the case of using the noise diagnostic device 10 to perform a noise diagnosis for identifying the cause of noise, an image like that illustrated in FIG. 7 is displayed, and various information such as the model name, serial number, and operating status is input (step S101).

Subsequently, in the noise diagnostic device 10, the operating mode is set to a sound recording mode and the microphone 17 is brought close to the part of the image forming device 20 where noise is being produced, to thereby record the noise and acquire sound data (step S102).

Subsequently, in the noise diagnostic device 10, the frequency analyzer 32 applies the STFT to the acquired sound data to thereby generate a frequency spectrum waveform expressing the change over time in the signal intensity distribution at each frequency (step S103).

Figure 8:
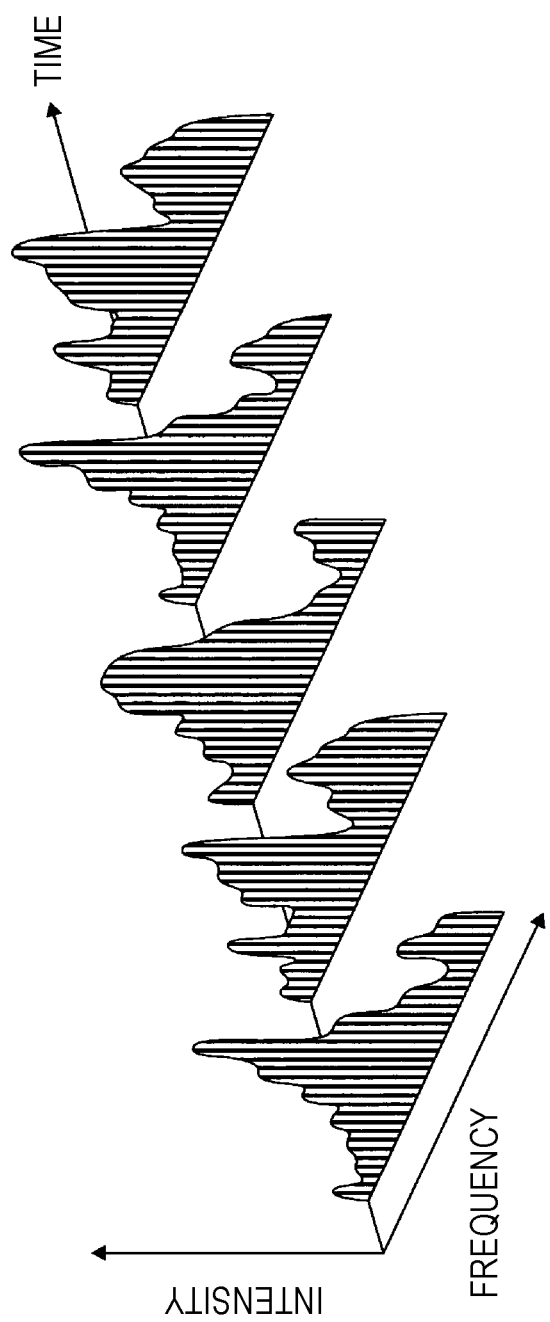
FIG. 8 is a diagram for explaining the concept of the STFT.

As illustrated in FIG. 8, the STFT performs a Fourier transform over short time intervals to compute the signal intensity for each frequency component according to the change over time. Additionally, FIG. 9 illustrates an example waveform in the case of presenting the analysis result obtained by the STFT as a single image of the frequency spectrum waveform.

Figure 9:
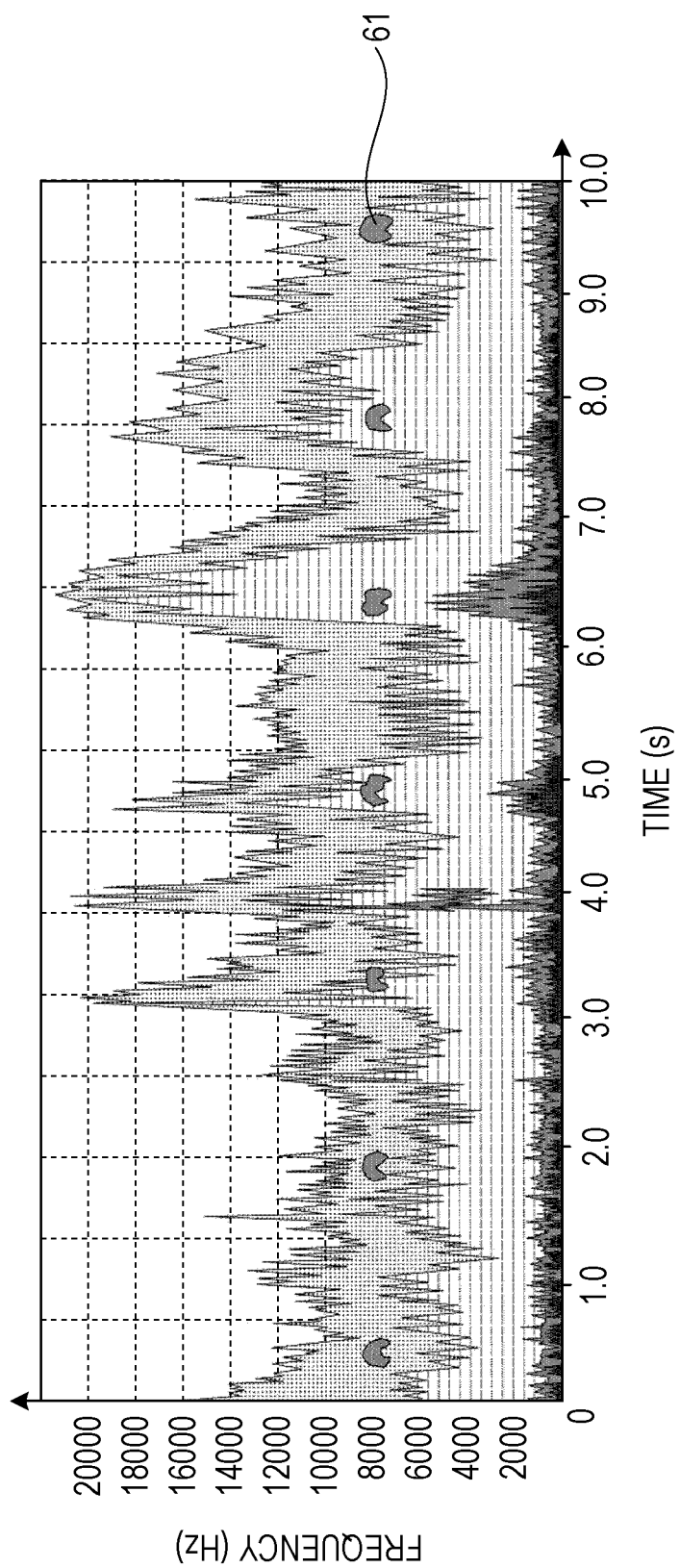
FIG. 9 is a diagram illustrating an example image of a frequency spectrum waveform based on an analysis result obtained by the STFT.

In the example frequency spectrum waveform illustrated in FIG. 9, the horizontal axis represents time, the vertical axis represents frequency, and the intensity at each frequency is expressed according to color. Note that in FIG. 9, differences of color are expressed by hatching patterns. Also, although FIG. 9 illustrates an example of a case in which the intensity at each frequency is expressed according to color, the intensity may also be expressed according to tone.

The example frequency spectrum waveform in FIG. 9 demonstrates a display indicating that a noise frequency component 61 is produced periodically at specific frequencies. Note that in the example frequency spectrum waveform illustrated in FIG. 9, the low-frequency components are ordinary operating sounds, and not noise frequency components.

Figure 10:
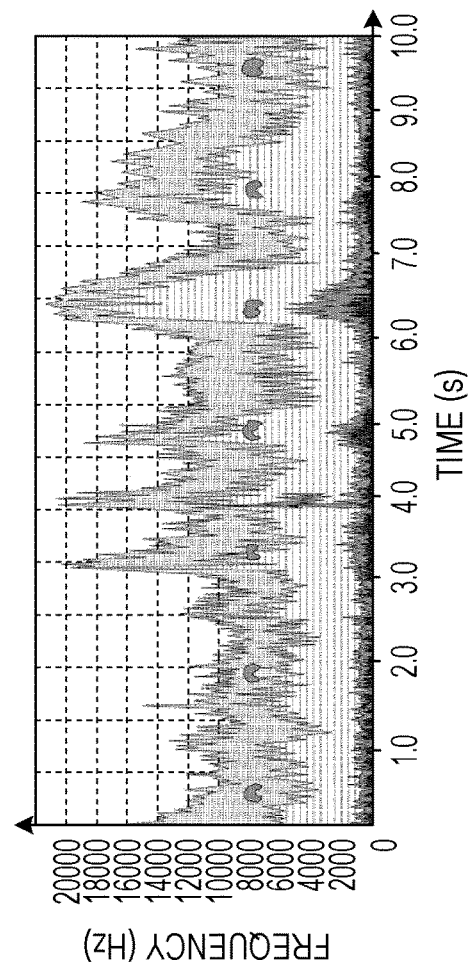
FIG. 10 is a diagram illustrating an example of a case of presenting a display prompting the user to specify a region estimated to be noise when presenting the user with a frequency spectrum waveform.

After a frequency spectrum waveform as illustrated in FIG. 9 is obtained, the controller 33 displays the frequency spectrum waveform on the display 35. Subsequently, as illustrated in FIG. 10, the controller 33 presents a display prompting the user to specify a region estimated to be noise on the displayed frequency spectrum waveform. The example illustrated in FIG. 10 demonstrates that the text "Specify the region of apparent noise." is displayed to prompt the user to specify a region estimated to be noise.

Subsequently, by referring to such a display, the user presented with the frequency spectrum waveform identifies the noise frequency component 61, and selects a region including the noise frequency component 61 by operating the touch panel, for example.

Figure 11:
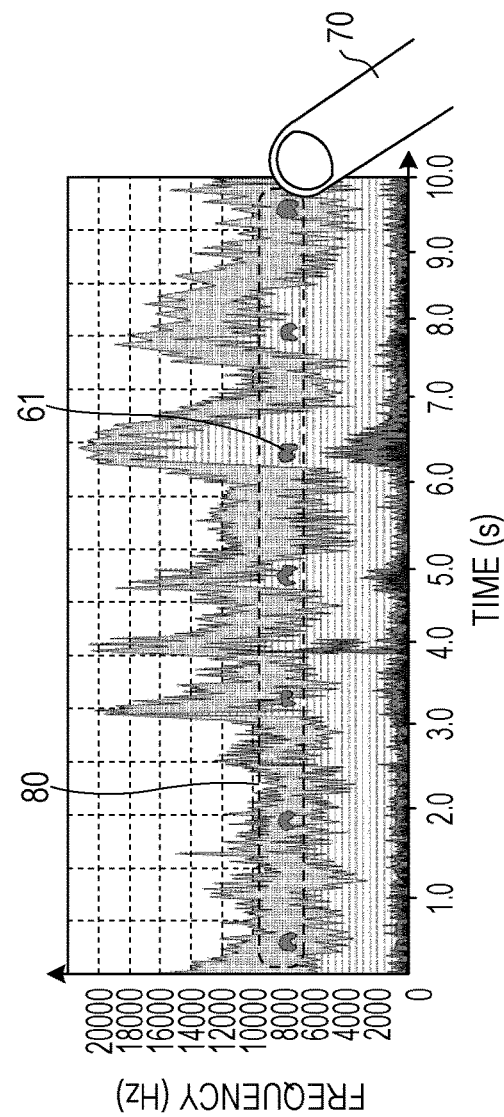
FIG. 11 is a diagram illustrating an example of a selected region 80 selected by the user in the example image of a frequency spectrum waveform in FIG. 10.

FIG. 11 illustrates an example of a selected region 80 selected by the user in this way. The example illustrated in FIG. 11 demonstrates that the user operates the touch panel with his or her finger 70 to thereby specify a rectangular region including multiple noise frequency components 61 as the selected region 80.

Figure 12:
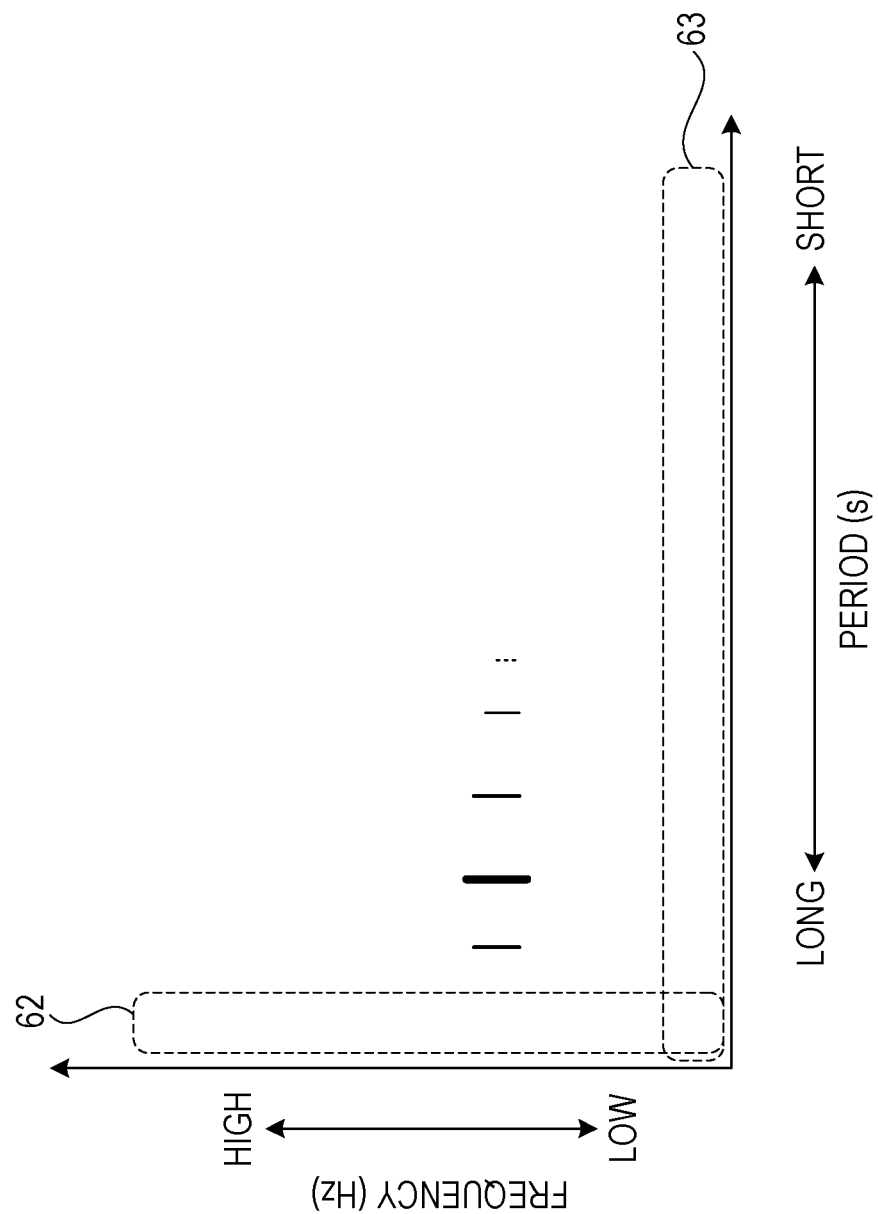
FIG. 12 is a diagram illustrating an example of a fast Fourier transform analysis result.

Subsequently, after the selected region 80 is specified in this way, the frequency analyzer 32 executes a fast Fourier transform (1D-FFT) on the frequency components included in the selected region 80 (step S104). FIG. 12 illustrates an example of an analysis result of the fast Fourier transform executed in this way.

Note that in FIG. 12, the period and the frequency of the noise is identified by detecting the period and the frequency of the signal of the frequency components on which the fast Fourier transform was performed. Note that since the noise also includes harmonic components and the like, multiple periods may be detected in some cases, but the period with the strongest signal intensity is detected as the noise period.

Also, since signal components having a long period equal to or greater than a certain period may be considered to be ordinary operating sounds or aperiodic noise, the region of signal components having such a long period is treated as an excluded region 62, and analysis results in the excluded region 62 are ignored.

Furthermore, since signal components of low frequency less than or equal to a certain frequency may be indistinguishable from ordinary operating sounds, the region of signal components having such a low frequency is treated as an excluded region 63, and analysis results in the excluded region 63 are ignored.

In the noise diagnostic device 10, from the analysis result of the fast Fourier transform, information about the frequency and the period of the noise is transmitted together with information about the operating status to the server device 50 (step S105). For example, information indicating a noise frequency of 4 kHz and a noise period of 2.0 s is transmitted to the server device 50.

Subsequently, in the server device 50, the waveform data storage 53 is searched on the basis of the received information, and frequency spectrum waveform data corresponding to the received information is extracted (step S106).

Subsequently, the server device 50 transmits the extracted frequency spectrum waveform data, together with information such as the original sound data, the cause of the noise, and the treatment to address the noise, to the noise diagnostic device 10 (step S107).

After that, the noise diagnostic device 10 receives the frequency spectrum waveform data transmitted from the server device 50 (step S108). Subsequently, the controller 33 of the noise diagnostic device 10 causes the display 35 to display the received frequency spectrum waveform and the frequency spectrum waveform obtained by the STFT (step S109).

Figure 13:
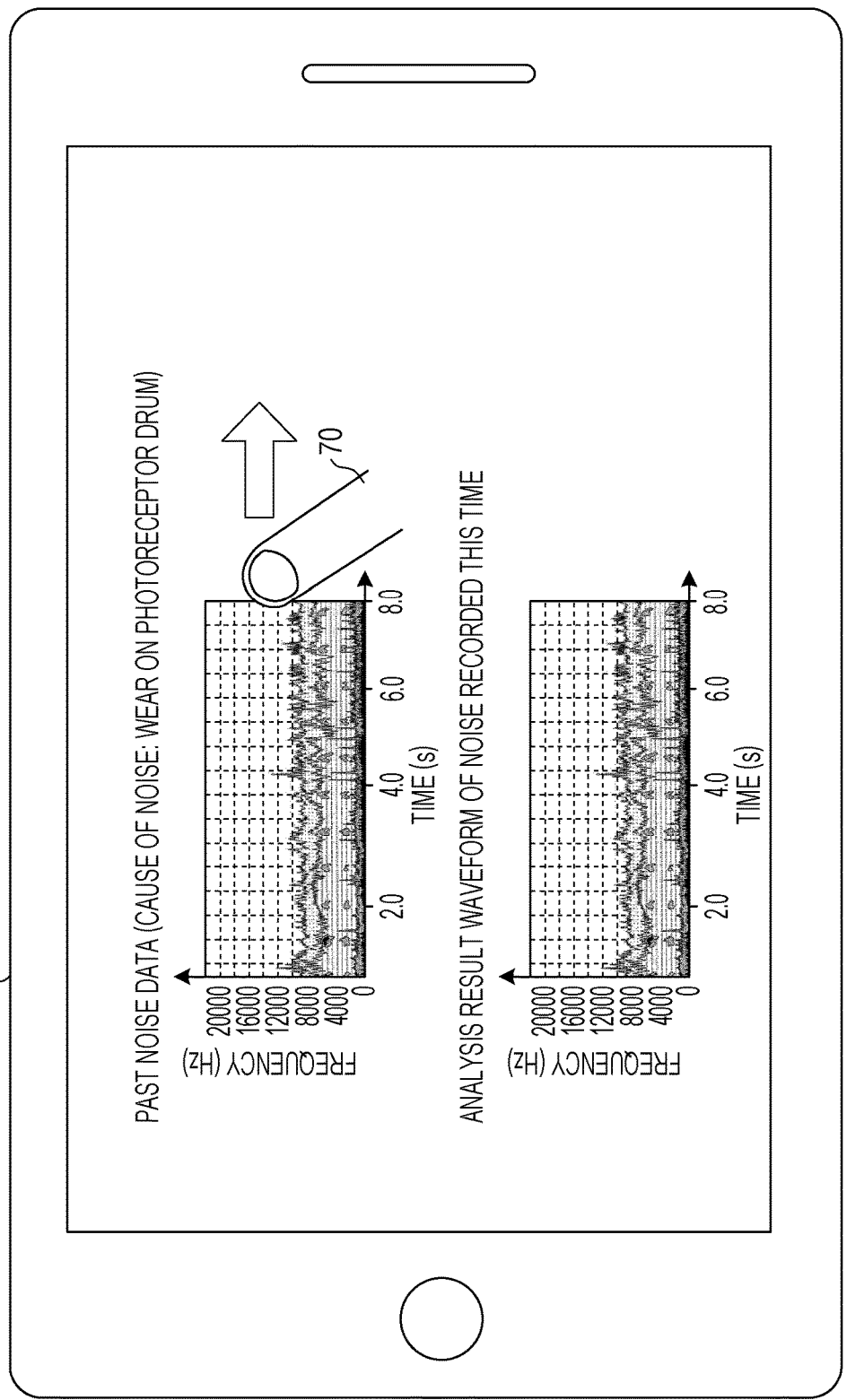
FIG. 13 is a diagram illustrating an example screen of a noise diagnostic device 10 on which two frequency spectrum waveforms are displayed.

FIG. 13 illustrates an example screen on the noise diagnostic device 10 displaying two frequency spectrum waveforms in this way.

The example screen illustrated in FIG. 13 demonstrates that the frequency spectrum waveform obtained by the STFT in the frequency analyzer 32 is displayed as the "Analysis result waveform of noise recorded this time", while the frequency spectrum waveform transmitted from the server device 50 is displayed as "Past noise data" together with the cause of the noise, "wear on photoreceptor drum".

The service engineer attempting to perform a noise diagnosis compares these two frequency spectrum waveforms, and identifies the cause of the noise by determining whether or not the noise components in the waveforms resemble each other.

Figure 14:
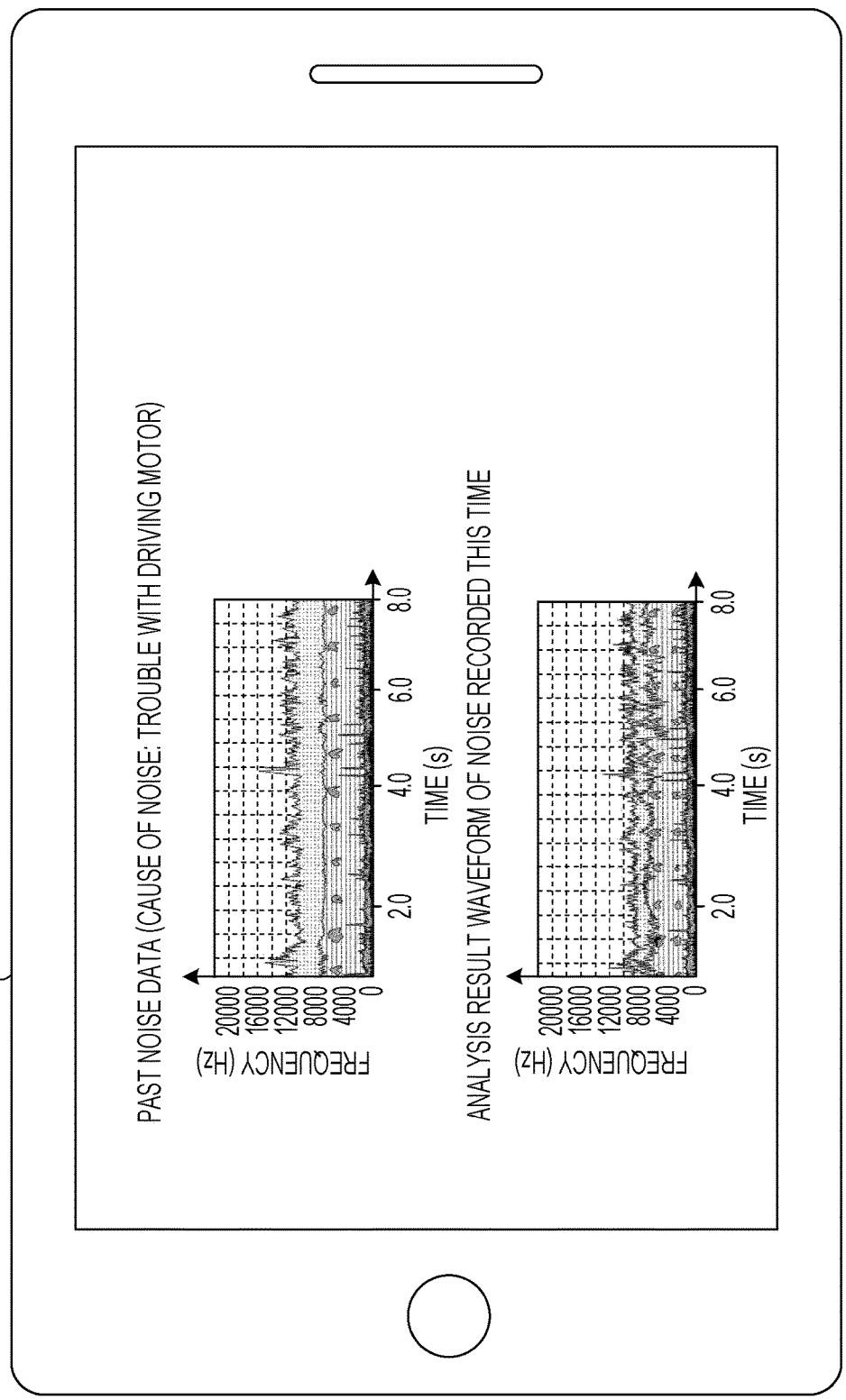
FIG. 14 is a diagram illustrating an example image for a case in which separate frequency spectrum waveforms with a different cause of noise are displayed compared to the example screen illustrated in FIG. 13.

Also, when multiple frequency spectrum waveforms are transmitted from the server device 50, a different frequency spectrum waveform like in FIG. 14 is displayed by performing a touch operation in the horizontal direction on the image of the frequency spectrum waveform being displayed as the "Past noise data", for example.

FIG. 14 illustrates an example image displaying a frequency spectrum waveform of noise for which the cause of the noise is "trouble with driving motor".

When multiple frequency spectrum waveforms are transmitted in this way, the service engineer identifies the cause of the noise by determining which of the frequency spectrum waveforms resembles the frequency spectrum waveform of the noise recorded this time. Note that when identifying the cause of the noise, the cause of the noise is identified not only by simply comparing features such as the shape of the frequency spectrum waveform or the period and the frequency of the noise components, but also by using the sound playback unit 37 to play back the original sound data to listen to and compare the noise acquired this time to the sound corresponding to the frequency spectrum waveform transmitted from the server device 50.

Next, instead of the analysis mode for identifying the cause of noise being produced, operation will be described for a noise waveform search mode for searching for sample waveforms of noise stored in the server device 50.

Figure 15:
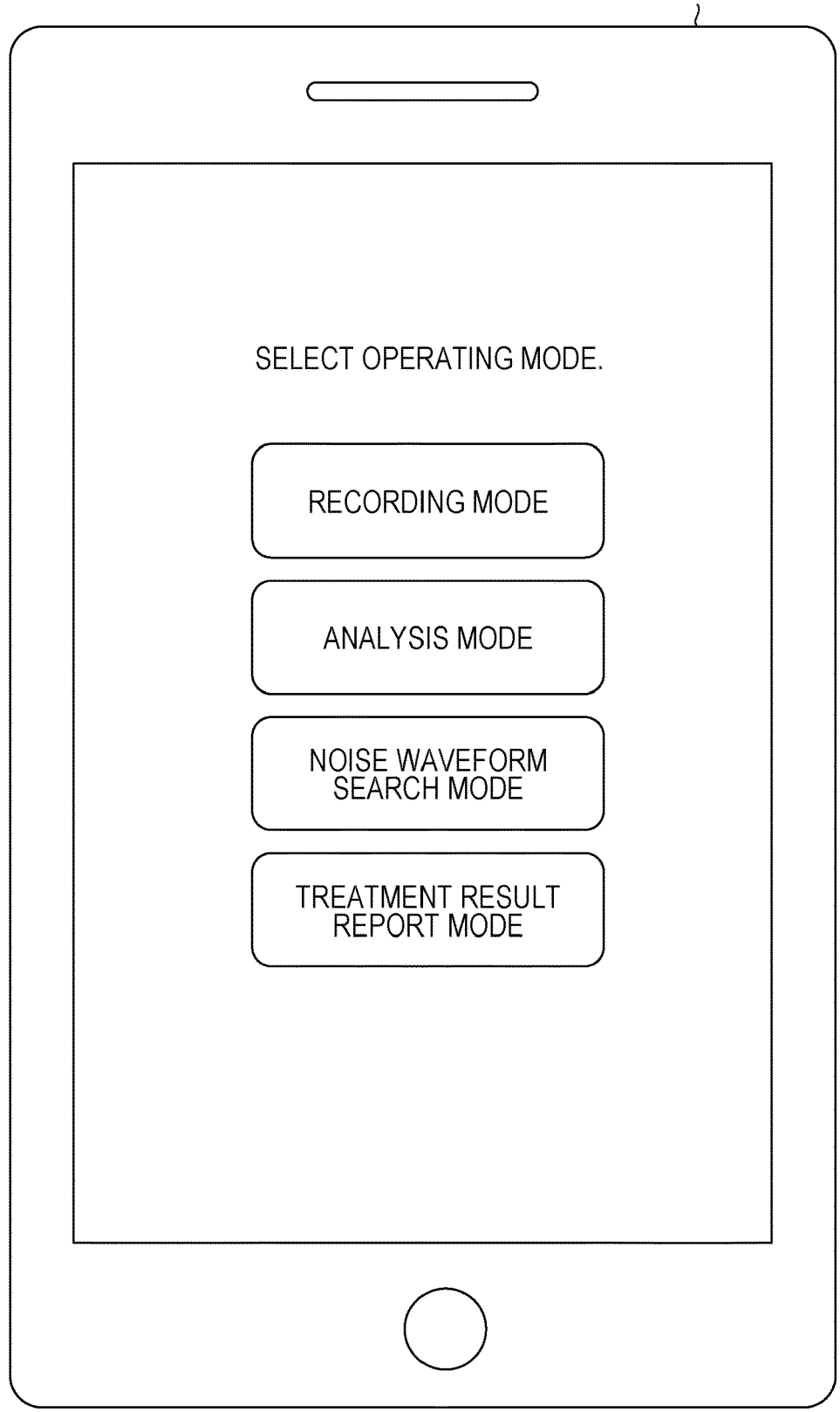

First, FIG. 15 illustrates an example launch screen when the noise diagnostic device 10 is powered on. On the example launch screen illustrated in FIG. 15, four buttons for selecting a recording mode, an analysis mode, a noise waveform search mode, and a treatment result report mode are displayed.

Herein, the recording mode is an operating mode for recording noise from the image forming device 20, while the analysis mode is an operating mode for conducting a process such as frequency analysis on recorded noise to identify the cause of the noise. Also, the noise waveform search mode is an operating mode for searching among sample waveforms of noise stored in the server device 50 to find sample waveforms of noise matching specific conditions. Also, the treatment result report mode is an operating mode for reporting a treatment result and providing feedback after applying a treatment to the noise.

At this point, the service engineer attempting to search for sample waveforms of noise changes the operating mode to the noise waveforms search mode by operating the "Noise Waveform Search Mode" button.

After changing to the noise waveform search mode, a screen for inputting noise sample waveform search parameters as illustrated in FIG. 16 is displayed. On this example input screen, search parameters may be input into search fields such as noise type, onomatopoeia classification, specific onomatopoeia, sound characteristics, origin, condition, and cause to enable searching for sample waveforms of noise.

Additionally, in the present exemplary embodiment, the search parameters that may be input into the search fields are preset, with search parameters like those illustrated in FIG. 17 being prepared for each search field.

In the example search parameters for noise sample waveforms illustrated in FIG. 17, search parameters such as staccato, continuous, one-time, and irregular may be set with respect to the "noise type" search field.

In addition, search parameters such as squealing, squeaking, grinding, and rattling may be set with respect to the "onomatopoeia classification" search field.

Also, after the above onomatopoeia classification has been selected, multiple onomatopoeias included in the selected onomatopoeia classification become selectable for the "specific onomatopoeia" search field. Examples of correspondences between the onomatopoeia classification and the specific onomatopoeia will be described with reference to FIG. 18.

For example, referring to FIG. 18, for the onomatopoeia classification designated "squealing", the specific onomatopoeias "krrrr", "keeee", and "grrrr" are associated. Also, for the onomatopoeia classification designated "squeaking", the specific onomatopoeias "ki-ki-ki", "gi-gi-gi", and "creak creak" are associated.

Note that the onomatopoeia classifications and onomatopoeias illustrated in the present exemplary embodiment are used for descriptive purposes, and that the types of onomatopoeias, the types of onomatopoeia classifications, and the like are merely one example.

By associating more specific onomatopoeias with each of the onomatopoeia classifications in this way, a user such as a service engineer attempting to search for sample waveforms of noise becomes able to perform searches using more fine-grained search parameters.

Next, a specific example of actually inputting search parameters into the search parameter input screen illustrated in FIG. 16 will be described below.

Figure 19:
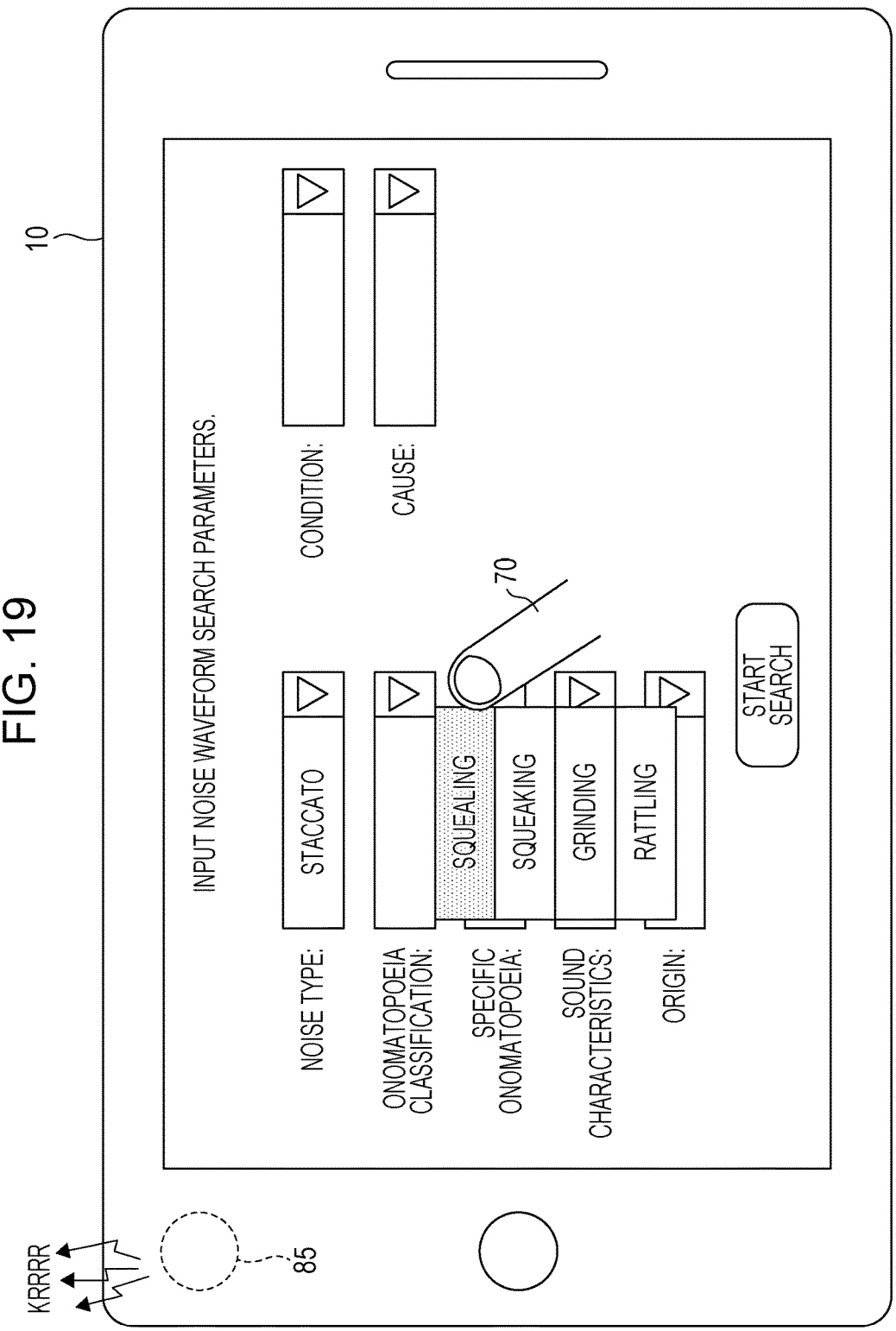
FIG. 19 is a diagram illustrating how four onomatopoeia classification candidates are displayed by operating a search parameter input field labeled onomatopoeia classification.

FIG. 19 illustrates how, by setting the "staccato" search parameter in the "noise type" search field and using a finger 70 to operate the input field of the "onomatopoeia classification" search parameter, the four onomatopoeia classification candidates of "squealing", "squeaking", "grinding", and "rattling" are displayed. Additionally, FIG. 19 illustrates how the user is about to select the "squealing" onomatopoeia classification from among the four onomatopoeia classification candidates.

Subsequently, as FIG. 19 demonstrates, by selecting the "squealing" onomatopoeia classification, a squealing "krrrr" sound corresponding to the "squealing" onomatopoeia classification is output from a speaker 85.

Figure 20:
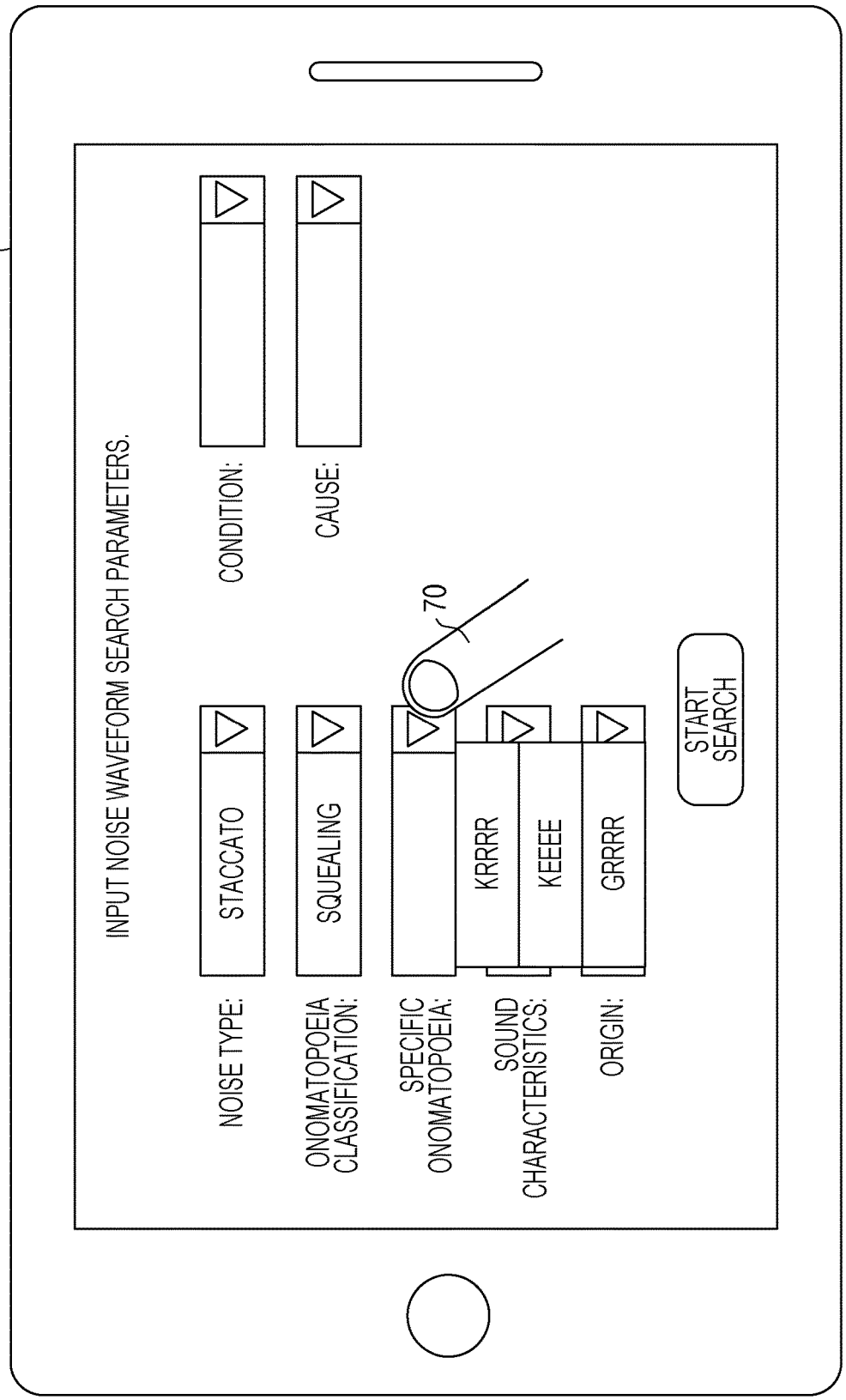
FIG. 20 is a diagram illustrating how, by setting a search parameter labeled "squealing" as the onomatopoeia classification, onomatopoeia labeled "krrrr", "keeee", and "grrrr" become selectable as specific onomatopoeia candidates.

Subsequently, by setting the "squealing" search parameter in the "onomatopoeia classification" search field on the input screen illustrated in FIG. 19, the onomatopoeias "krrrr", "keeee", and "grrrr" become selectable as specific onomatopoeia candidates for the "specific onomatopoeia" search field, as illustrated in FIG. 20.

Figure 21:
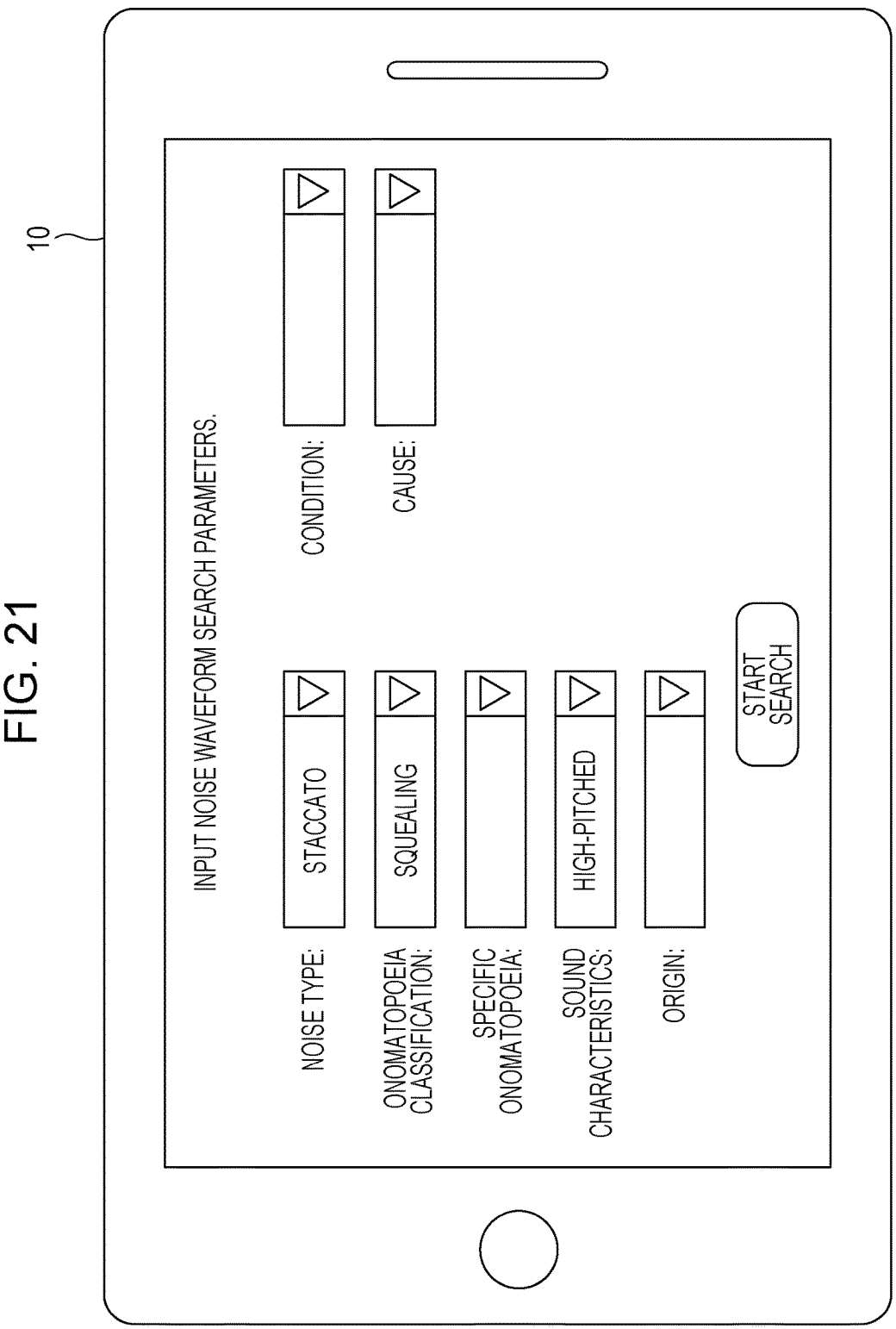
FIG. 21 is a diagram illustrating an example input screen in a case of setting search parameters for respective search terms, without setting a search parameter for the specific onomatopoeia.
Figure 22:
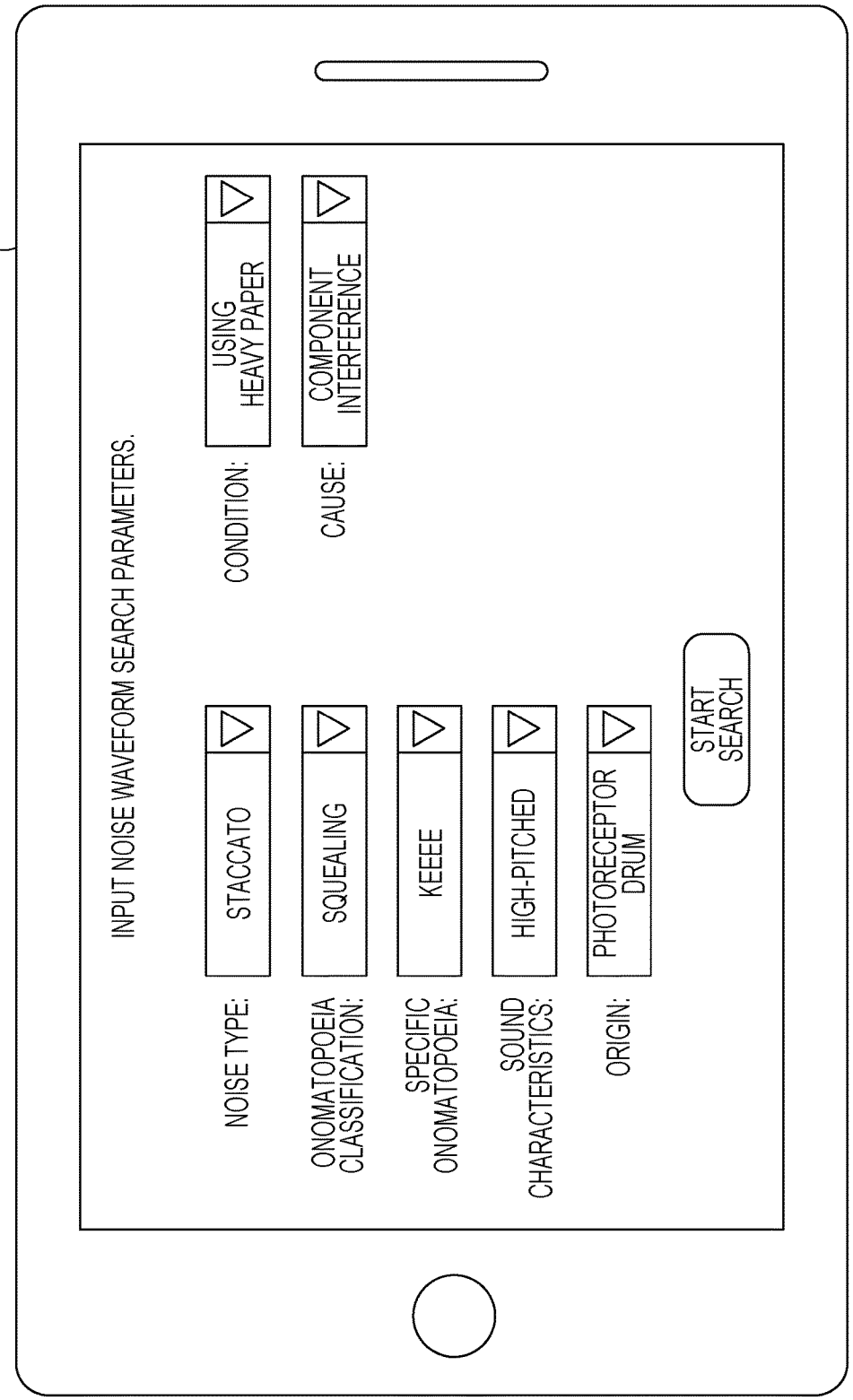
FIG. 22 is a diagram illustrating an example input screen in a case of setting search parameters for respective search terms, while also setting a search parameter for the specific onomatopoeia.

FIGS. 21 and 22 illustrate example input screens in the case of setting search parameters in the respective search fields according to the above method.

FIG. 21 illustrates a case in which the "staccato" search parameter is set in the "noise type" search field, the "squealing" search parameter is set in the "onomatopoeia classification" search field, and the "high-pitched" search parameter is set in the "sound characteristics" search field.

In the example of search parameter input illustrated in FIG. 21, a search parameter has been input only for the onomatopoeia classification, whereas a search parameter has not been input for the specific onomatopoeia, which is left blank.

For this reason, when search parameters are input as illustrated in FIG. 21, the search will return all sample waveforms of noise registered as having onomatopoeia included in the "squealing" onomatopoeia classification.

Meanwhile, in FIG. 22, the "staccato" search parameter is set in the "noise type" search field, the "squealing" search parameter is set in the "onomatopoeia classification" search field, and the "keeee" search parameter is set in the "specific onomatopoeia" search field. Additionally, on the example input screen in FIG. 22, the "high-pitched" search parameter is set in the "sound characteristics" search field, the "photoreceptor drum" search parameter is set in the "origin" search field, the "using heavy paper" search parameter is set in the "condition" search field, and the "component interference" search parameter is set in the "cause" search field.

In this way, when search parameters are input as illustrated in FIG. 22, by setting the onomatopoeia "keeee" as the specific onomatopoeia, only sample waveforms of noise registered as having the "keeee" onomatopoeia will be returned by the search.

Next, FIG. 23 illustrates an example search results screen in a case in which a "start search" button is operated and a search is executed after search parameters like those illustrated in FIG. 21 are input.

On the example screen illustrated in FIG. 23, five sample waveforms of noise designated the sample waveforms 3, 5, 11, 23, and 49 are displayed as search results.

As described above, on the input screen illustrated in FIG. 21, the "squealing" onomatopoeia classification is set as a search parameter, but a search parameter is not set for the specific onomatopoeia. Thus, FIG. 23 demonstrates how sample waveforms of noise registered as having the onomatopoeias "krrrr", "keeee", and "grrrr" included in the "squealing" onomatopoeia classification become the search targets.

Additionally, the example search results screen illustrated in FIG. 23 illustrates how the field for each sample waveform is provided with a playback icon 91 for playing back sound and a display icon 92 for displaying the noise waveform.

If the user touches the playback icon 91 or the display icon 92, the corresponding noise is played back or the frequency spectrum waveform of the corresponding noise is displayed.

Figure 24:
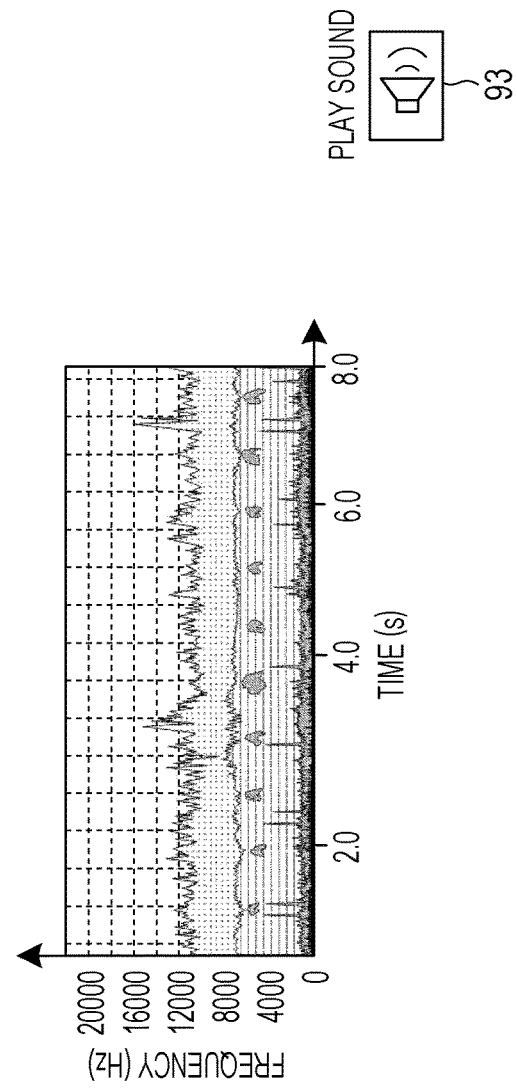
FIG. 24 is a diagram illustrating an example of a noise sample waveform viewing screen.

For example, on the example search results screen illustrated in FIG. 23, if the display icon 92 corresponding to the sample waveform 49 is operated, a screen like that illustrated in FIG. 24 is displayed.

On the example of a noise sample waveform viewing screen illustrated in FIG. 24, an image of the frequency spectrum waveform of the noise sample waveform 49 is displayed. By presenting such a display, the service engineer is able to refer to a sample waveform of noise matching the set search parameters, and check the frequency spectrum waveform of a noise sample waveform in advance, or use the frequency spectrum waveform of a noise sample waveform as a reference when identifying the cause of the acquired noise.

Note that a playback icon 93 for specifying the playback of noise is also displayed on the noise sample waveform viewing screen illustrated in FIG. 24. For this reason, a user such as a service engineer is able to operate the playback icon 93 and thereby directly listen to the noise corresponding to the frequency spectrum waveform being displayed.

Figure 25:
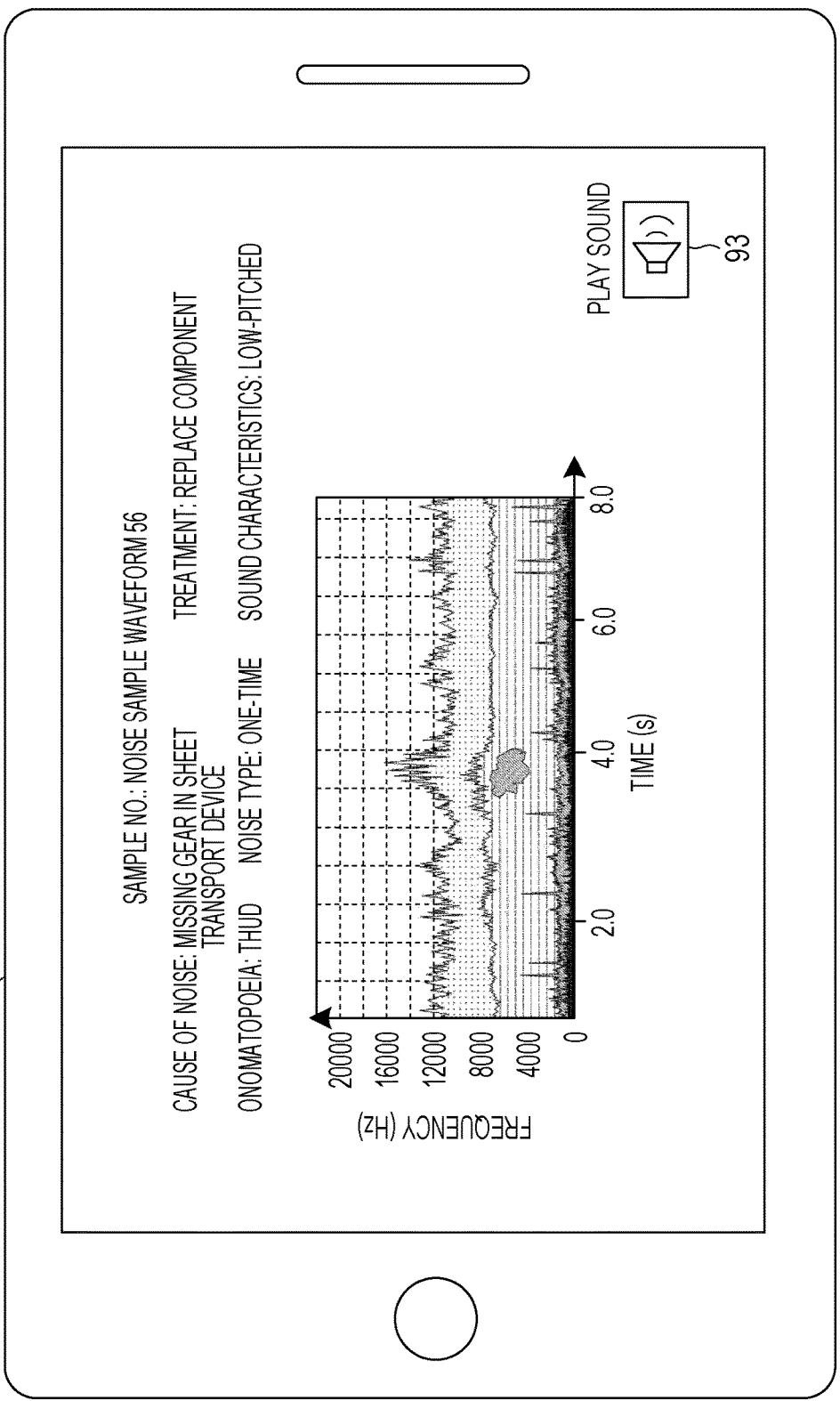
FIG. 25 is a diagram illustrating another example of a noise sample waveform viewing screen.

In addition, FIG. 25 illustrates a viewing screen in the case of displaying another noise sample waveform. FIG. 25 illustrates an example viewing screen in the case of displaying an example of a sample waveform of a one-time sound that lacks periodicity.

Since a one-time sound as illustrated in FIG. 25 lacks periodicity, period information may not be acquired even if the sound is recorded and frequency analysis is performed. For this reason, to perform cause analysis on such a one-time sound, it is desirable to search for waveform samples of noise according to a method like the one described above, and identify the cause of noise by comparing the shapes of the frequency spectrum waveforms, or by actually listening to and comparing the sounds.

In the case of identifying the cause of noise from a one-time sound due to reasons like the above, a noise sample waveform search mode as described above may be utilized.

Note that although the present exemplary embodiment describes the case of expressing onomatopoeia in English, it is also possible to change the onomatopoeia according to the conditions under which the system is used, such as the country, geographical region, language, or ethnicity. Specifically, the language to use may be selectable from among languages such as Japanese, English, Chinese, Korean, French, and German, for example, thereby enabling the use of onomatopoeia and onomatopoeia classifications corresponding to the selected language when searching for sample waveforms of noise as described earlier.

Furthermore, a Global Positioning System (GPS) receiver may be provided in the noise diagnostic device 10, and on the basis of position information obtained by the GPS receiver, factors such as the country and geographical region where the noise diagnostic device 10 is positioned may be identified, and the onomatopoeic expressions may be switched automatically to those of the language used in the identified country or geographical region. According to this configuration, the language to use may be switched automatically without having to select a language, thereby saving the user from the trouble of manually configuring the language to use.

[Exemplary Modifications]

The foregoing exemplary embodiment is described using a case in which the noise diagnostic device 10 is a tablet, but an exemplary embodiment of the present invention is not limited thereto, and the present invention may also be applied when using another device as the noise diagnostic device. For example, if the operating panel of the image forming device 20 is configured to be removable from the main unit, is able to communicate with the server device 50, and includes a built-in sound signal acquisition function, the operating panel may also be treated as the noise diagnostic device.

Furthermore, the foregoing exemplary embodiment is described using a case in which the device targeted for noise analysis is an image forming device, but the device targeted for noise analysis is not limited to being an image forming device, and the present invention is similarly applicable even in the case of another device, insofar as the device may possibly produce noise of a periodic nature.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A diagnostic device comprising:
   an input unit that accepts input of an onomatopoeia to use in a diagnostic sound sample search for identifying a cause of a noise made by a machine;
   an acquisition unit comprising a microphone that acquires the noise made by the machine;
   a frequency analyzer that performs time-frequency analysis on the noise acquired by the acquisition unit and generates frequency spectrum waveform data by applying a short-time Fourier transform to the noise acquired and stores the frequency spectrum waveform data;
   a search unit, implemented by a processor, that searches for diagnostic sound samples received from a server using the input onomatopoeia and the frequency spectrum waveform data and compares the frequency spectrum waveform data to the diagnostic sound samples;
   a display that displays a search result from the search unit; and
   if one search result is selected from a plurality of search results, the diagnostic device provides a treatment for the cause of the noise made by the machine based on the search result selected.

2. The diagnostic device according to claim 1, further comprising:
   a playback unit that, if the one search result is selected from among the plurality of search results, plays back a sound corresponding to the selected search result.

3. The diagnostic device according to claim 1, wherein the frequency spectrum waveform data expresses change over time in an intensity distribution at each frequency of a sound.

4. The diagnostic device according to claim 1, wherein the frequency spectrum waveform data includes a first analysis result expressing change over time in an intensity distribution at each frequency; and
   the diagnostic device further comprising an extraction unit, implemented by the processor, that extracts a second analysis result including information about a period and a frequency of sound determined from the first analysis result, wherein
   the display displays the first analysis result, and also displays a second analysis result selected on a basis of the information about the period and the frequency of sound of the second analysis result.

5. The diagnostic device according to claim 4, further comprising:
   a communicator that communicates with an external device;
   a transmitter that transmits, to the external device through the communicator, the information about the period and the frequency of sound extracted by the extraction unit; and
   a receiver that receives, from the external device through the communicator, the second analysis result selected on a basis of the information about the period and the frequency of sound extracted by the extraction unit, wherein
   the display displays the first analysis result, and also displays the second analysis result received by the receiver.

6. A diagnostic device comprising:
   an input unit that accepts input of an onomatopoeia classification to use in a diagnostic sound sample search for identifying a cause of a noise made by a machine;
   an acquisition unit comprising a microphone that acquires the noise made by the machine;
   a frequency analyzer that performs time-frequency analysis on the noise acquired by the acquisition unit and generates frequency spectrum waveform data by applying a short-time Fourier transform to the noise acquired and stores the frequency spectrum waveform data;
   a search unit, implemented by a processor, that searches for diagnostic sound samples received from a server using the input onomatopoeia classification and the frequency spectrum waveform data and compares the frequency spectrum waveform data to the diagnostic sound samples;

a display that displays a search result from the search unit; and if one search result is selected from a plurality of search results, the diagnostic device provides a treatment for the cause of the noise made by the machine based on the search result selected.

7. The diagnostic device according to claim 6, further comprising:

a playback unit that, if the one search result is selected from among the plurality of search results, plays back a sound corresponding to the selected search result.

8. The diagnostic device according to claim 6, wherein each search result includes an onomatopoeia classification candidate and if the onomatopoeia classification candidate is selected, the display displays a plurality of onomatopoeias included in the onomatopoeia classification candidate.

9. A diagnostic system comprising:

a diagnostic device including an input unit that accepts input of an onomatopoeia to use in a diagnostic sound sample search for identifying a cause of a noise made by a machine, an acquisition unit comprising a microphone that acquires the noise made by the machine;

a frequency analyzer that performs time-frequency analysis on the noise acquired by the acquisition unit and generates frequency spectrum waveform data by applying a short-time Fourier transform to the noise acquired and stores the frequency spectrum waveform data, a first transmitter that transmits information about the input onomatopoeia accepted by the input unit and the frequency spectrum waveform data, a receiver that receives a search result of sound samples matching the input onomatopoeia and the frequency spectrum waveform data, and a display that displays the search result of the sound samples received by the receiver; and a server device including storage that stores a plurality of sound samples associated with onomatopoeia, and a second transmitter that, if information about an onomatopoeia to use in a sound sample search is received from the diagnostic device, selects the sound samples matching the received information about the onomatopoeia and the frequency spectrum waveform data from among the plurality of sound samples stored in the storage, and transmits the selected sound samples to the diagnostic device wherein if one search result is selected from a plurality of search results, the diagnostic device provides a treatment for the cause of the noise made by the machine based on the search result selected.

10. The diagnostic system according to claim 9, wherein the server device additionally includes a modification unit, implemented by a processor, that, for each user, modifies the onomatopoeia associated with the plurality of sound samples stored in the storage.

11. A diagnostic method comprising:

accepting input of an onomatopoeia to use in a sound sample search;

acquiring a noise made by a machine;

performing time-frequency analysis on the noise acquired and generating frequency spectrum waveform data by applying a short-time Fourier transform to the noise acquired and storing the frequency spectrum waveform data;

searching for diagnostic sound samples received from a server using the input onomatopoeia and the frequency spectrum waveform data by comparing the frequency spectrum waveform data to the diagnostic sound samples;

displaying a search result from the searching; and providing a treatment for the cause of the noise made by the machine if one search result is selected from a plurality of search results based on the search result selected.

12. A non-transitory computer readable medium storing a program causing a computer to execute a diagnostic process, the process comprising:

accepting input of an onomatopoeia to use in a sound sample search;

acquiring a noise made by a machine;

performing time-frequency analysis on the noise acquired and generating frequency spectrum waveform data by applying a short-time Fourier transform to the noise acquired and storing the frequency spectrum waveform data;

searching for diagnostic sound samples received from a server using the input onomatopoeia and the frequency spectrum waveform data by comparing the frequency spectrum waveform data to the diagnostic sound samples;

displaying a search result from the searching; and providing a treatment for the cause of the noise made by the machine if one search result is selected from a plurality of search results based on the search result selected.

* * * * *